(12) United States Patent
Umesawa et al.

(10) Patent No.: US 7,940,761 B2
(45) Date of Patent: *May 10, 2011

(54) COMMUNICATION CONNECTION METHOD, AUTHENTICATION METHOD, SERVER COMPUTER, CLIENT COMPUTER AND PROGRAM

(75) Inventors: Kentaro Umesawa, Kawasaki (JP); Toshinari Takahashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 508 days.

This patent is subject to a terminal disclaimer.

(21) Appl. No.: 12/003,924

(22) Filed: Jan. 3, 2008

(65) Prior Publication Data

US 2008/0155670 A1    Jun. 26, 2008

Related U.S. Application Data

(63) Continuation of application No. 10/948,699, filed on Sep. 24, 2004, now Pat. No. 7,366,170.

(30) Foreign Application Priority Data

Sep. 25, 2003 (JP) ................. 2003-332822
Nov. 28, 2003 (JP) ................. 2003-400111
Jul. 30, 2004 (JP) ................. 2004-223137

(51) Int. Cl.
*H04L 12/56* (2006.01)
(52) U.S. Cl. ................. 370/389; 709/225
(58) Field of Classification Search .......... None
See application file for complete search history.

(56) References Cited

U.S. PATENT DOCUMENTS

| | | | |
|---|---|---|---|
| 7,024,552 B1 | 4/2006 | Caswell et al. | |
| 7,174,458 B2 * | 2/2007 | Araki et al. | 713/168 |
| 7,366,170 B2 * | 4/2008 | Umesawa et al. | 370/389 |
| 7,512,796 B2 * | 3/2009 | Haverinen et al. | 713/168 |

(Continued)

FOREIGN PATENT DOCUMENTS

| | | |
|---|---|---|
| JP | 2000-324104 | 11/2000 |
| JP | 2002-333958 | 11/2002 |
| JP | 2003-091503 | 3/2003 |
| JP | 2003-125022 | 4/2003 |

OTHER PUBLICATIONS

Notification of Reasons for Rejection dated Apr. 30, 2008 from the Japanese Patent Office for a counterpart Japanese Patent Application No. 2004-223137.

*Primary Examiner* — Anh-Vu Ly
(74) *Attorney, Agent, or Firm* — Finnegan, Henderson, Farabow, Garrett & Dunner, L.L.P.

(57) ABSTRACT

Communication connection method for connecting server computer to client computer via network, comprises storing group identification information items for identifying groups, in relation to information indicating number of connection request packets uniquely and secretly allocated to each group of groups, each group including users allowed to access server computer, counting connection request packets received from client computer within preset period to obtain counted number, determining whether information corresponds to counted number, acquiring one group of groups to which connection request packets corresponding to counted number are allocated, if information corresponds to counted number, determining whether resources of server computer are allocated to group indicated by acquired group identification item, generating connection request acknowledgement packet in response to at least one of received connection request packets, and transmitting generated connection request acknowledgement packet to network.

20 Claims, 23 Drawing Sheets

| Server name | Preset member of connection request packets |
|---|---|
| Server A | 800 |
| Server B | 237 |
| ⋮ | ⋮ |

(100)

U.S. PATENT DOCUMENTS

| | | |
|---|---|---|
| 2002/0035685 A1 | 3/2002 | Ono et al. |
| 2003/0056097 A1 | 3/2003 | Araki et al. |
| 2003/0135625 A1* | 7/2003 | Fontes et al. .................. 709/228 |
| 2003/0221011 A1 | 11/2003 | Shitano |
| 2005/0210243 A1* | 9/2005 | Archard et al. ................ 713/160 |
| 2006/0031407 A1* | 2/2006 | Dispensa et al. ............... 709/219 |
| 2007/0130466 A1 | 6/2007 | Isozaki et al. |

* cited by examiner

| Source port number | | Destination port number | |
|---|---|---|---|
| Sequence number | | | |
| Acknowledgement number | | | |
| Data offset | Reserved bit | Control flag | Total length |
| Checksum | | Urgent | |
| Option | | | Padding |
| Data | | | |

FIG. 3

| Source port number | Destination port number |
|---|---|
| Packet length | Checksum |
| Data | |

| Server name | Preset member of connection request packets |
|---|---|
| Server A | 800 |
| Server B | 237 |
| ⋮ | ⋮ |

| Client name | Present number of packets | Elapsed time |
|---|---|---|
| Client A | 234 | 30 msec |
| Client C | 30 | 10 msec |
| ⋮ | ⋮ | ⋮ |

| Number of packets | Group name |
|---|---|
| 800 | Group 1 |
| 31 | Group 3 |
| ⋮ | ⋮ |

| Group name | Maximum number of connections | Present number of connections |
|---|---|---|
| Group 1 | 20 | 1 |
| Group 3 | 100 | 20 |
| ⋮ | ⋮ | ⋮ |

130

| Server name | Authentication port number |
|---|---|
| Server A | 2000, 3000, 4000 |
| Server B | 437, 34, 645, 57 |
| ⋮ | ⋮ |

F I G. 13A

| Authentication port number |
|---|
| 2000, 3000, 4000 |

F I G. 13B

| Client name | Authentication port number |
|---|---|
| Client A | 2000, 4000 |
| Client B | 2000 |
| ⋮ | ⋮ |

| Server name | Port number | Order |
|---|---|---|
| Server A | 2000<br>3000<br>4000 | 1<br>2<br>3 |
| Server B | 437<br>34<br>645<br>57 | 2<br>4<br>1<br>3 |
| ⋮ | ⋮ | ⋮ |

| Port number | Order |
|---|---|
| 2000<br>3000<br>4000 | 1<br>2<br>3 |

| Client name | Authentication port number |
|---|---|
| Client A | 2000, 3000 |
| Client B | 2000 |
| ⋮ | ⋮ |

| Client name | Number of transmissions |
|---|---|
| Client A | 2 |
| Client B | 1 |
| ⋮ | ⋮ |

1320

| Server name | Authentication port number | Limit time |
|---|---|---|
| Server A | 2000, 3000, 4000 | 30 s |
| Server B | 437, 34, 645, 57 | 45 s |
| ⋮ | ⋮ | ⋮ |

FIG. 19A

| Authentication port number | Limit time |
|---|---|
| 2000, 3000, 4000 | 30 s |

FIG. 19B

| Client name | Authentication port number |
|---|---|
| Client A | 2000, 4000 |
| Client B | 2000 |
| ⋮ | ⋮ |

| Server name | Port number | Interval |
|---|---|---|
| Server A | 2000<br>3000<br>4000 | 15 s<br>10 s<br>— |
| Server B | 437<br>34<br>645<br>57 | 10 s<br>10 s<br>15 s<br>— |
| ⋮ | ⋮ | ⋮ |

| Port number | Interval |
|---|---|
| 2000<br>3000<br>4000 | 15 s<br>10 s<br>— |

| Client name | Authentication port number |
|---|---|
| Client A | 2000, 3000 |
| Client B | 2000 |
| ⋮ | ⋮ |

FIG. 21C

| Server name | Port number | Type |
|---|---|---|
| Server A | 2000<br>3000<br>4000 | TCP<br>UDP<br>TCP |
| Server B | 437<br>—<br>645<br>57 | UDP<br>ICMP<br>TCP<br>UDP |
| ⋮ | ⋮ | ⋮ |

FIG. 23A

| Port number | Type |
|---|---|
| 2000<br>3000<br>4000 | TCP<br>UDP<br>TCP |

FIG. 23B

| Client name | Authentication port number |
|---|---|
| Client A | 2000, 3000 |
| Client B | 2000 |
| ⋮ | ⋮ |

FIG. 23C

| Server name | Port number | Key data |
|---|---|---|
| Server A | 2000<br>3000<br>4000 | 0x0ABCD ⋯ C<br>0x6AB3D ⋯ 5<br>0x6D335 ⋯ 4 |
| Server B | 437<br>645<br>57 | 0x0AA3B ⋯ A<br>0x6AF3D ⋯ 5<br>0xCA030 ⋯ A |
| ⋮ | ⋮ | ⋮ |

10600

| Authentication session identifier | | Packet identifier | Divisional authentication information |
|---|---|---|---|
| IP address | Source port number | | |
| 134.16.11.234 | 65435 | 2345 | 0x12345 ⋯ 34 |
| | | 2456 | 0x23456 ⋯ 39 |
| 23.45.64.23 | 6789 | 234 | 0xABDF ⋯ FF |
| ⋮ | ⋮ | ⋮ | ⋮ |

12600

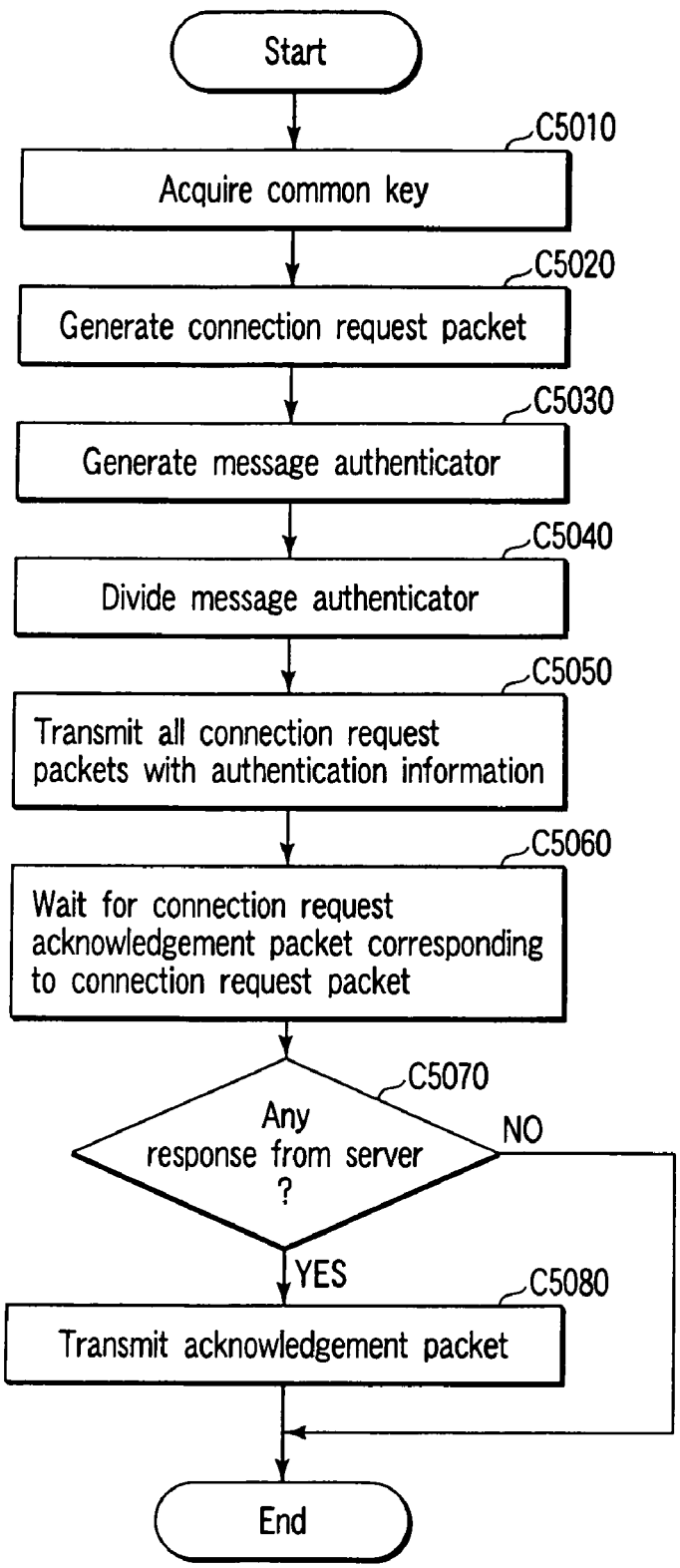
F I G. 27

| Authentication session identifier | | Packet identifier | Divisional authentication information | Authentication session start time (seconds elapsing from reference time) |
|---|---|---|---|---|
| IP address | Source port number | | | |
| 134.16.11.234 | 65435 | 2345 | 0x2 ⋯ 34 | 2343452356 |
| | | 2456 | 0x2 ⋯ 39 | |
| 23.45.64.23 | 6789 | 234 | 0xD ⋯ F | 2343452370 |
| ⋮ | ⋮ | ⋮ | ⋮ | ⋮ |

| Index | Time information TC (elapsed time from reference time) |
|---|---|
| 1 | 6456575426425 |
| 2 | 24565657547 |
| ⋮ | ⋮ |

COMMUNICATION CONNECTION METHOD, AUTHENTICATION METHOD, SERVER COMPUTER, CLIENT COMPUTER AND PROGRAM

CROSS-REFERENCE TO RELATED APPLICATIONS

This application is a continuation of U.S. application Ser. No. 10/948,699, filed Sep. 24, 2004 now U.S. Pat. No. 7,366,170, which is based upon and claims the benefit of priority from prior Japanese Patent Application No. 2003-332822, filed Sep. 25, 2003; Japanese Patent Application No. 2003-400111, filed Nov. 28, 2003; and Japanese Patent Application No. 2004-223137, filed Jul. 30, 2004, the entire contents of all of which are incorporated herein by reference.

BACKGROUND OF THE INVENTION

1. Field of the Invention

The present invention relates to a communication connection method for reliably connecting a server computer to a client computer in response to an access request from the client computer, and a server computer and a program.

The present invention also relates to an authentication method for performing communication between a client computer and server computer on a network, a server computer, a client computer and a program.

2. Description of the Related Art

Recently, client-server systems have become widely utilized in which an unspecified or specified number of client computers are connected to a server computer via a packet-exchange network using, for example, the Internet, and the server computer supplies data in response to requests from client computers.

"Packet" means a certain amount of data transmitted through a network. Packets are basically formed of a header and data. The header comprises a source Internet protocol (IP) address, destination IP address, etc. To perform a request for legal access based on transmission control protocol/Internet protocol (TCP/IP), the following, for example, is performed: (1) A client computer transmits a connection request packet (synchronization [SYN] packet) to a server computer. (2) The server computer, in turn, transmits a connection request acknowledgement packet (synchronization acknowledgement [SYN+ACK] packet) to the client computer. (3) The client computer transmits an acknowledgement (ACK) packet to the server computer, thereby establishing a logical connection to transmit and/or receive data using a higher-level application. The access scheme of this type is called a three-way handshake scheme.

When establishing a TCP/IP connection, it is necessary for the server computer to beforehand secure resources (memory area, disk area) for a certain amount of TCP connection processing. When this connection is released, the server computer releases the resources. The resources for TCP connection processing are assigned without discriminating connection requesters (users of client computers or client computers themselves). If the amount of resources is insufficient, a new connection cannot be established. Specifically, the following two problems occur: Firstly, illegitimate users may intentionally establish a connection flood in which a large number of connections are established to a server computer to use up its resources, thereby making the server computer unable to provide services to legitimate clients. Secondly, when many users of low priority are utilizing services, users of high priority cannot utilize them.

To overcome the above problems, a method has been proposed in which users are divided into groups, and resources for TCP connection processing are managed based on the order of priority of the groups (see, for example, Jpn. Pat. Appln. KOKAI Publication No. 2003-125022). This method comprises the following steps:

(1) A client computer transmits a SYN packet to a server computer;

(2) The server computer refers to the user identification of the received SYN packet (the transmitter address of the SYN packet) to identify the user group to which the connection requester belongs to; and (3) The server computer confirms whether sufficient resources for communication processing remain for the detected user identification. If sufficient resources remain, resources for TCP connection processing are assigned to the client computer.

Thus, TCP processing resources are assigned to each user group, therefore the adverse influence of a connection flood by an illegitimate client can be limited to the user group to which the illegitimate client belongs, thereby preventing services by the server computer from being stopped. Further, by virtue of grouping in light of priority, even if a user of a low priority utilizes a large number of services, TCP processing resources can be assigned to a user of a high priority.

In the above method, a computer address (IP address, MAC address) contained in a SYN packet is used as a user identification, and TCP connection processing resources are assigned based on the user identification.

However, in the method, if a plurality of users use a single client computer, resource allocation corresponding to each user cannot be realized. Further, when IP addresses are dynamically allocated, users must register their addresses each time their addresses are changed. The MAC address contained in a SYN packet can be used only when the client computer and server computer belong to the same network. Furthermore, since IP addresses and MAC addresses can be relatively easily forged, an illegitimate client or a client of a low priority can access the server computer using a forged address, thereby using a service illegally.

In the above-described client/server system including client computers and a server computer, there is a case where when the server computer provides a service to a client computer, it identifies the connection requester (the user of the client computer or the client computer itself), and then provides a service corresponding to the authority of the identified requester.

Such identification, determination of authority and provision of a service corresponding to the authority as the above (this will hereinafter be referred to as "access control") is generally performed in the following manner after the server computer assigns communication resources to the client computer:

(i) In accordance with a connection request from the client computer, a connection is established between the client computer and server computer.

(ii) A server application program installed in the server computer transmits, to a client application program installed in the client computer, data that instructs it to return authentication information such as a password (there also exist information items utilizing common- or public-key codes or various coded protocols).

(iii) After receiving the data, the client application program acquires authentication information, and then transmits it to the server computer (the user of the client computer inputs the authentication information, or the client application program automatically acquires it).

(iv) The server application program determines whether the acquired authentication information is legitimate, determines the authority of the connection requester if the authentication information is determined to be legitimate, and provides a service corresponding to the authority.

Using an access control scheme of an application level as described above, a legitimate connection requester can be selected from an unspecified number of clients, and a service corresponding to the authority of the requester can be provided.

However, the above-described access control scheme is executed provided that connection is established, and hence it cannot control the establishment of connection itself. In other words, the access control scheme cannot prevent a denial-of-service (DoS) attack or a distributed-denial-of-service (DDoS) attack, in which an illegitimate client or illegitimate clients establish to exhaust the connection processing resources of the server computer. The DoS attack is behavior by an illegitimate client to use up or make unusable the resources that should be used by a legitimate client, in order to prevent the legitimate client from using the resources. The DDoS attack is DoS attacks performed by a plurality of client computers.

Further, the above-described access control scheme is executed by application software, and attacks on software cannot be prevented. An attack on software is an attack exploiting bugs that exist in application software. Using bugs, an attacker can make a detour to avoid authentication processing in a computer to attack, and can acquire authority to use the computer. For example, when bugs exist in the authentication portion of SSH (Secure Shell) as a protocol for realizing reliable remote control of computers through the Internet, if an attacker transmits an attack code to a computer, instead of legitimate authentication information, they can use the computer.

Such problems as cannot always be solved simply by access control by an application can be overcome by access control performed on a client computer using the TCP layer or IP layer of TCP/IP. This technique enhances the security of the server computer. As such a technique, there is a method in which a list that stores source IP addresses, destination port numbers, etc., for determining whether connection is allowable is installed in a server computer, and a received packet is inspected using the list to determine whether connection is allowable.

Access control using the source IP addresses, destination port numbers, etc., however, has the following problems:

(1) This control scheme is vulnerable to forged IP addresses. In general, IP addresses can be easily forged, and port numbers can be arbitrarily designated. Accordingly, an illegitimate client computer can easily make a detour by transmitting a packet that contains a forged source IP address.

(2) This control scheme cannot identify each user. Each client computer can be identified using the source IP address. However, if a plurality of users use a client computer, they cannot be identified.

(3) This control scheme cannot deal with dynamic IP addresses. In access control using IP addresses, it is necessary to beforehand register the IP addresses of client computers as access control targets. However, in mobile environments or dynamic host configuration protocol (DHCP) environments, the IP addresses of client computers dynamically change, which makes it impossible to use the access control scheme.

There is a conventional authentication method using port access, which solves the problems of the access control scheme using IP addresses and port numbers (see, for example, Jpn. Pat. Appln. KOKAI Publication No. 2003-91503).

In this method:

(1) A client computer transmits a packet to a plurality of authentication ports provided in a server computer;

(2) The server computer confirms whether the client computer has accessed all authentication ports (their specific port numbers are private);

(3) The server computer having all the authentication ports accessed opens a communication port (its specific number is public); and (4) The client computer accesses the communication port of the server computer to perform communication.

This method utilizes, as the identification information of a connection requester, the pattern of access by the client computer to the server computer.

An illegitimate client does not know a plurality of authentication ports, therefore cannot establish a connection to the server computer. Thus, the problems raised by the authentication method using an application can be solved as in the case of access control using the IP layer or TCP layer. Moreover, by making access patterns (combinations of authentication port numbers in the above case) correspond to respective users, the users of a single client computer can be identified individually. In this method, it is sufficient if access by the same IP address to authentication ports is considered, and it is not necessary to set IP addresses for determining allowance/disallowance.

Thus, the above method can solve the problems raised by access control using an application, and solve the two problems raised by the conventional access control scheme using the TCP layer or IP layer, which concern the fact that the method cannot identify each of the users and the fact that the method cannot deal with dynamic IP addresses.

Although the authentication method using the access pattern of the TCP layer can solve part of the problems raised by the conventional access control scheme using the TCP layer or IP layer, it cannot completely prevent attacks using forged IP addresses. In this method, a server computer opens a communication port (its specific number is public) after confirming whether a client computer has accessed all authentication ports (their specific port numbers are private), and determines that the client computer connected to the opened communication port is a legitimate connection requester. However, in this method, it is not determined whether the client computer connected to the opened communication port and the client computer having accessed the authentication ports are actually the same connection requester. Therefore, this method cannot prevent an illegitimate client from accessing the opened communication port just when a legitimate connection requester accesses the authentication ports and the communication port is opened. Thus, in the conventional method, even an illegitimate client who does not know the authentication ports can establish a connection if they use a forged IP address.

BRIEF SUMMARY OF THE INVENTION

According to a first aspect of the invention, there is provided a communication connection method for connecting a server computer to a client computer via a network, the method comprising: storing, in a storage of the server computer, a plurality of group identification information items for identifying, respectively, a plurality of groups, in relation to information indicating number of connection request packets uniquely and secretly allocated to each group of the groups, each group including a plurality of users allowed to access the server computer; counting connection request packets received from the client computer within a preset period to obtain a counted number; determining whether the information corresponds to the counted number; acquiring one group of the groups to which the connection request packets corresponding to the counted number are allocated, if the information corresponds to the counted number; determining whether resources of the server computer are allocated to the group indicated by the acquired group identification item; generating a connection request acknowledgement packet in response to at least one of the received connection request packets; and transmitting the generated connection request acknowledgement packet to the network.

According to a second aspect of the invention, there is provided a server computer for establishing a connection to a client computer, comprising: a storage which stores a plurality of group identification information items for identifying, respectively, a plurality of groups, in relation to information indicating number of connection request packets uniquely and secretly allocated to each group of the groups, each group including a plurality of users allowed to access the server computer; a counter which counts connection request packets received from the client computer within a preset period to obtain a counted number; an identifying unit configured to identify whether the information corresponds to the counted number, and acquires one group of the groups to which the connection request packets corresponding to the counted number are allocated, if the information corresponds to the counted number; a resource determination unit configured to determine whether resources of the server computer are allocated to the one group, and to generate a connection request acknowledgement packet in response to at least one of the received connection request packets; and a transmitting unit configured to transmit the generated connection request acknowledgement packet to the network.

According to a third aspect of the invention, there is provided a program stored in a computer readable medium for connecting a server computer to a client computer via a network in the server computer, the program comprising: first code means for instructing the server computer to store, in a storage of the server computer, a plurality of group identification information items for identifying, respectively, a plurality of groups, in relation to information indicating number of connection request packets uniquely and secretly allocated to each group of the groups, each group including a plurality of users allowed to access the server computer; second code means for instructing the server computer to count connection request packets received from the client computer within a preset period to obtain a counted number; third code means for instructing the server computer to determine whether the information corresponds to the counted number, and to acquire one group of the groups to which the connection request packets corresponding to the counted number are allocated, if the information corresponds to the counted number; fourth code means for instructing the server computer to determine whether resources of the server computer are allocated to the one group, and to generate a connection request acknowledgement packet in response to at least one of the received connection request packets; and fifth code means for instructing the server computer to transmit the generated connection request acknowledgement packet to the network.

According to a fourth aspect of the invention, there is provided an authentication method for use in a server computer for authenticating that a client computer connected to the server computer via a network is a legitimate client computer, if starting communication with the client computer, the method comprising: receiving a plurality of connection request packets from the network; authenticating a sender of the connection request packets based on information acquired from the connection request packets; generating a connection request acknowledgement packet in response to at least one of the connection request packets, if the sender is authenticated; and transmitting the generated connection request acknowledgement packet to the network.

According to a fifth aspect of the invention, there is provided an authentication method for use in a server computer for authenticating that a client computer connected to the server computer via a network is a legitimate client computer, if starting communication with the client computer, the method comprising: prestoring a cipher key commonly used between the server computer and the client computer; receiving a plurality of connection request packets from the network; authenticating a sender of the connection request packets based on the prestored cipher key and authentication information acquired from the connection request packets; generating a connection request acknowledgement packet in response to at least one of the connection request packets, if the sender is authenticated; and transmitting the generated connection request acknowledgement packet to the network.

According to a sixth aspect of the invention, there is provided an authentication method for use in a server computer for authenticating that a client computer connected to the server computer via a network is a legitimate client computer, if starting communication with the client computer, the method comprising: presetting information concerning a plurality of connection request packets; storing the information as access pattern information; receiving a plurality of connection request packets from the network; generating a connection request acknowledgement packet in response to at least one of the received connection request packets, if the received connection request packets satisfy the access pattern information; and transmitting the generated connection request acknowledgement packet to the network.

According to a seventh aspect of the invention, there is provided an authentication method for use in a server computer for authenticating that a client computer connected to the server computer via a network is a legitimate client computer, if starting communication with the client computer, the method comprising: pre-arranging a plurality of predetermined port numbers in a first table; receiving, by ports with certain port numbers, connection request packets transmitted from the client computer; arranging, into a second table, each of the certain port numbers in relation to identification information for identifying the client computer, if each of the certain port numbers is included in the predetermined port numbers; and monitoring the second table to generate a connection request acknowledgement packet in response to one of the received connection request packets, if the certain port numbers arranged in the second table are identical to the predetermined port numbers, and transmit the connection request acknowledgement packet to the client computer.

According to a eighth aspect of the invention, there is provided a server computer for authenticating that a client computer connected to the server computer via a network is a legitimate client computer, if starting communication with the client computer, the computer comprising: a receiving unit configured to receive a plurality of connection request packets from the network; an authentication unit configured to authenticate a sender of the connection request packets based on information acquired from the connection request packets; a generation unit configured to generate a connection request acknowledgement packet in response to at least one of the connection request packets, if the sender is authenticated;

and a transmitting unit configured to transmit the generated connection request acknowledgement packet to the network.

According to a ninth aspect of the invention, there is provided a server computer for authenticating that a client computer connected to the server computer via a network is a legitimate client computer, if starting communication with the client computer, the computer comprising: a storage which prestores a cipher key commonly used between the server computer and the client computer; a receiving unit configured to receive a plurality of connection request packets from the network; an authentication unit configured to authenticate a sender of the connection request packets based on the prestored cipher key and authentication information acquired from the connection request packets; a generation unit configured to generate a connection request acknowledgement packet in response to at least one of the connection request packets, if the sender is authenticated; and a transmitting unit configured to transmit the generated connection request acknowledgement packet to the network.

According to a tenth aspect of the invention, there is provided a server computer for authenticating that a client computer connected to the server computer via a network is a legitimate client computer, if starting communication with the client computer, the computer comprising: a presetting unit configured to preset information concerning a plurality of connection request packets, and store the information as access pattern information; a receiving unit configured to receive a plurality of connection request packets from the network; a monitor which monitors whether the received connection request packets satisfy the access pattern information; a generating unit configured to generate a connection request acknowledgement packet in response to one of the received connection request packets, if the received connection request packets satisfy the access pattern information; and a transmitting unit configured to transmit the generated connection request acknowledgement packet to the network.

According to a eleventh aspect of the invention, there is provided a server computer for authenticating that a client computer connected to the server computer via a network is a legitimate client computer, if starting communication with the client computer, the computer comprising: a first storage which stores a plurality of predetermined port numbers; a receiving unit configured to receive a plurality of connection request packets transmitted from the network; a determination unit configured to determine a client computer based on each of the connection request packets, if each of the connection request packets accesses one predetermined port number included in the predetermined port numbers; a second storage which stores the one predetermined port number in relation to identification information for identifying the client computer; a monitor which monitors the second storage and detects whether all accessed port numbers stored in relation to the identification information are identical to the predetermined port numbers; a generating unit configured to generate a connection request acknowledgement packet in response to one of the received connection request packets, if the all accessed port numbers are identical to the predetermined port numbers; and a transmitting unit configured to transmit the connection request acknowledgement packet to the network.

According to a twelfth aspect of the invention, there is provided a program stored in a computer readable medium for connecting a server computer to a client computer via a network in the server computer, the program being executed by a server computer to authenticate that a client computer connected to the server computer via a network is a legitimate client computer, if starting communication with the client computer, the program comprising: first code means for instructing the server computer to receive a plurality of connection request packets from the network; second code means for instructing the server computer to authenticate a sender of the connection request packets based on information acquired from the connection request packets; third code means for instructing the server computer to generate a connection request acknowledgement packet in response to at least one of the connection request packets, if the sender is authenticated; and fourth code means for instructing the server computer to transmit the generated connection request acknowledgement packet to the network.

According to a thirteenth aspect of the invention, there is provided a program stored in a computer readable medium, the program being executed by a server computer to authenticate that a client computer connected to the server computer via a network is a legitimate client computer, if starting communication with the client computer, the program comprising: first code means for instructing the server computer to prestore a cipher key commonly used between the server computer and the client computer; second code means for instructing the server computer to receive a plurality of connection request packets from the network; third code means for instructing the server computer to authenticate a sender of the connection request packets based on the prestored cipher key and authentication information acquired from the connection request packets; fourth code means for instructing the server computer to generate a connection request acknowledgement packet in response to at least one of the connection request packets, if the sender is authenticated; and fifth code means for instructing the server computer to transmit the generated connection request acknowledgement packet to the network.

According to a fourteenth aspect of the invention, there is provided a program stored in a computer readable medium, the program being executed by a server computer to authenticate that a client computer connected to the server computer via a network is a legitimate client computer, if starting communication with the client computer, the program comprising: first code means for instructing the server computer to preset information concerning a plurality of connection request packets, and store the information as access pattern information; second code means for instructing the server computer to receive a plurality of connection request packets from the network; third code means for instructing the server computer to generate a connection request acknowledgement packet in response to at least one of the received connection request packets, if the received connection request packets satisfy the access pattern information; and fourth code means for instructing the server computer to transmit the generated connection request acknowledgement packet to the network.

According to a fifteenth aspect of the invention, there is provided a client apparatus for issuing a request for establishing a connection for communication to a server computer connected via a network, the apparatus comprising: a storage which stores a plurality of predetermined port numbers employed in the server computer; a read unit configured to sequentially read, from the storage, those of the predetermined port numbers which are yet unused, and to sequentially generate a plurality of connection request packets using the read port numbers; a transmitting unit configured to sequentially transmit the connection request packets; and a receiving unit configured to receive a connection request acknowledgement packet corresponding to one of the sequentially transmitted connection request packets, communication being started using one of the predetermined port numbers included in the connection request acknowledgement packet.

BRIEF DESCRIPTION OF THE SEVERAL VIEWS OF THE DRAWING

FIG. 3 is a view illustrating a TCP header;

FIG. 4 is a view illustrating a UDP header;

FIGS. 7A, 7B, 7C and 7D are views illustrating examples of a connection establishing table 100, connection control table 110, group identification table 120 and resources management table 130 employed in the first embodiment;

FIGS. 13A, 13B and 13C are views illustrating a connection establishment table 1010, determination table 1110 and connection control table 1210 employed in a first modification of the second embodiment;

FIGS. 16A, 16B, 16C and 16D are views illustrating a connection establishment table 1020, determination table 1120, connection control table 1220, and order-setting table 1320 employed in a second modification of the second embodiment;

FIGS. 19A, 19B and 19C are views illustrating a connection establishment table 1030, determination table 1130 and connection establishment table 1230 employed in a third modification of the second embodiment;

FIGS. 21A, 21B and 21C are views illustrating a connection establishment table 1040, determination table 1140 and connection control table 1240 employed in a fourth modification of the second embodiment;

FIGS. 23A, 23B and 23C are views illustrating a connection establishment table 1050, determination table 1150 and connection control table 1250 employed in another example of the second embodiment;

FIG. 27 is a flowchart useful in explaining the procedure of processing performed by a client computer 2 according to the first modification of the third embodiment;

FIGS. 29A and 29B are views illustrating a connection control table 12700 and replay-preventing table 14700 employed in a second modification of the third embodiment.

DETAILED DESCRIPTION OF THE INVENTION

Embodiments of the invention will be described in detail with reference to the accompanying drawings.

Figure 1:
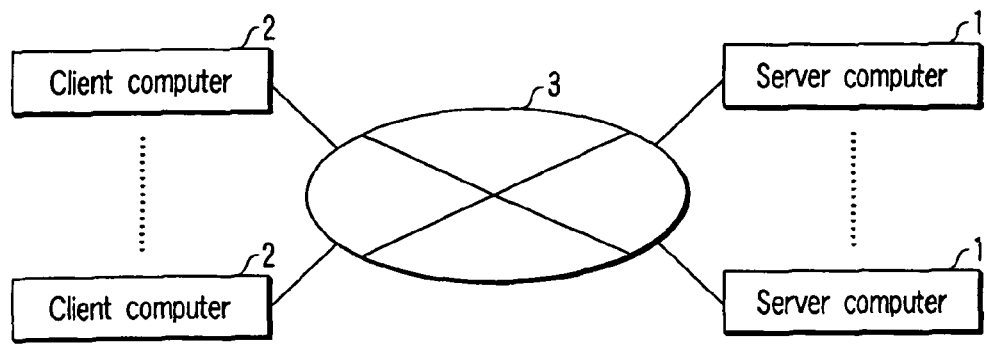
FIG. 1 is a view illustrating a communication system to which embodiments of the invention are applicable.

FIG. 1 shows a communication system to which embodiments of the invention are applicable. As shown, server computers 1 and client computers 2 are connected via a communication network 3 that includes an open network, such as the Internet, and dedicated lines connected thereto.

In general, communication between each server computer 1 and client computer 2 is performed using TCP/IP. TCP/IP includes a network access layer, network layer, transport layer and application layers arranged in this order from the lowest layer to the highest layer.

The network access layer corresponds to a combination of the physical layer and data link layer as open systems interconnection (OSI) reference models. The network access layer is a process layer that enables data transmission and reception using an electric or optical signal, and enables control necessary to adjust the flow of information between adjacent nodes.

The network (Internet) layer corresponds to the network layer as an OSI reference model. This layer is a process layer responsible for the routing of data between networks and the distribution of data for communication to computers.

The transport layer substantially corresponds to the transport layer as an OSI reference model. This layer is a process layer for providing a service and a data error check function to a designated application layer port. In the transport layer, two protocols, i.e., TCP (Transmission Control Protocol) and UDP (User Datagram Protocol), are usable. As will be described layer, TCP provides a connection-type environment that secures data reachability, while UDP provides a connectionless-type environment that does not secure data reachability.

The application layer corresponds to the application as an OSI reference model. This layer is a process layer for performing communication processing control that enables an application to perform data transmission and reception, or for performing processing unique to an application.

Figure 2:
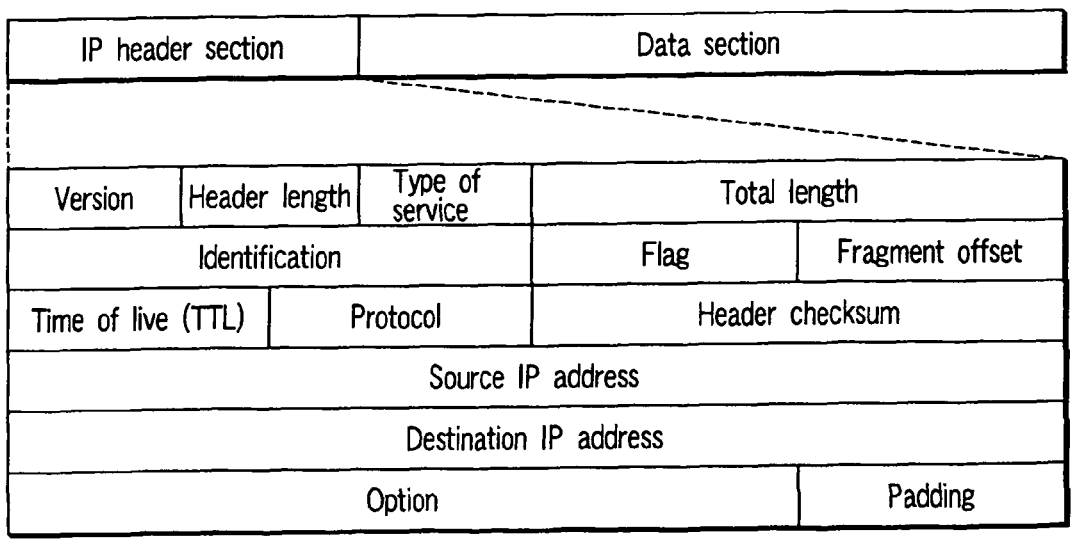
FIG. 2 is a view illustrating an IP header contained in an IP packet.

Communication using the network layer or network access layer is performed using IP packets. FIG. 2 shows the structure of a general IP packet. The IP packet comprises an IP header section and data section.

The IP header section comprises various types of information that include "Version", "Header length", "Type of service", "Packet length", "Identification", "Flag", "Fragment offset", "Time to live (TTL)", "Protocol", "Header checksum", "Source IP address", "Destination IP address", "Option" and "Padding". "Version" indicates the version of IP (e.g., IPv4, IPv6). "Header length" indicates the header length of the IP header section. "Type of service" designates the quality of communication service to a router. "Packet length" indicates the length of the entire IP packet. "Identification" indicates an identification used when restoring a fragment. "Flag" is used to control dividing processing. "Fragment offset" indicates the position of division. "Time to live (TTL)" indicates the number of routers that can be passed through. "Protocol" indicates an upper-layer protocol (e.g., ICMP is 1, TCP is 6, UDP is 17). "Header checksum" is used to guarantee that data is not destroyed. "Source IP address" indicates the address of a data sender. "Destination IP address" indicates the address of a destination. "Option" indicates an optional function utilized. "Padding" is used to adjust the leader length of each IP header to an integral multiple of 32 bits.

The data section includes a TCP, UDP or ICMP segment.

FIG. 3 shows the structure of a general TCP segment. The TCP segment comprises a header and data. The TCP header comprises various types of information that include "Source port number", "Destination port number", "Sequence number", "Acknowledgement number", "Data offset", "Reserved bit for extension", "Control flag", "Total length", "Checksum", "Urgent pointer", "Option" and "Padding". "Source port number" indicates the port number of a sender. "Destination port number" indicates the port number of a destination. "Sequence number" indicates the position of transmitted data. "Confirmation acknowledgement number" indicates the position of received data. "Data offset" indicates the start position of data carried by TCP. "Control flag" indicates the processing method or type of the TCP segment. "Total length", which indicates a data length receivable, is used for flow control. "Checksum" is used for guaranteeing that the TCP header and data are not destroyed. "Urgent pointer" indicates the position of data to be processed urgently. "Option" is used for enhancing the performance of communication based on TCP.

FIG. 4 shows the structure of a general UDP segment. The UDP segment comprises a UDP header section and data section. The UDP header section comprises various types of information that include "Source port number" indicating the port number of a sender, "Destination port number" indicating the port number of a destination, "Packet length" indicating the length of the UDP segment, and "Checksum" used to guarantee that the UDP header, IP address and protocol data is not destroyed.

In TCP, in general, (1) a client computer transmits a synchronization (SYN) packet to a server computer. (2) The server computer, in turn, transmits a connection request acknowledgement packet (in the first embodiment, this packet will be referred to as a synchronization acknowledgement (SYN+ACK) packet) to the client computer. (3) The client computer transmits an acknowledgement (ACK) packet to the server computer, thereby establishing a logical connection between logical ports using a three-way handshake scheme, thereby transmitting and/or receiving data using a higher-level application. The number of usable logical ports is 65535.

On the other hand, UDP and ICMP are protocols of connectionless communication, therefore no connection establishment is performed to transmit or receive data.

First Embodiment

In a first embodiment, the connection requesters that are allowed to access a certain server computer 1 are beforehand divided into a plurality of groups, and the number of transmissions of a connection request packet that differs between the groups is determined and used at least as authentication information for each group. In the first embodiment, connection request packets will be referred to as "synchronization (SYN) packets". Assume here that authentication information indicating the number of transmissions of a SYN packet is commonly used as secret information between the certain server computer 1 and each connection requester. Common use of information indicating the number of transmissions may be realized, kept secret from a third party, using an on-line system in which a channel secured by a cipher protocol (provided by, for example, a secure socket layer (SSL) technique) is utilized, or using an off-line system such as mailing. Further, each connection requester may hold different criteria for different servers.

Figure 5:
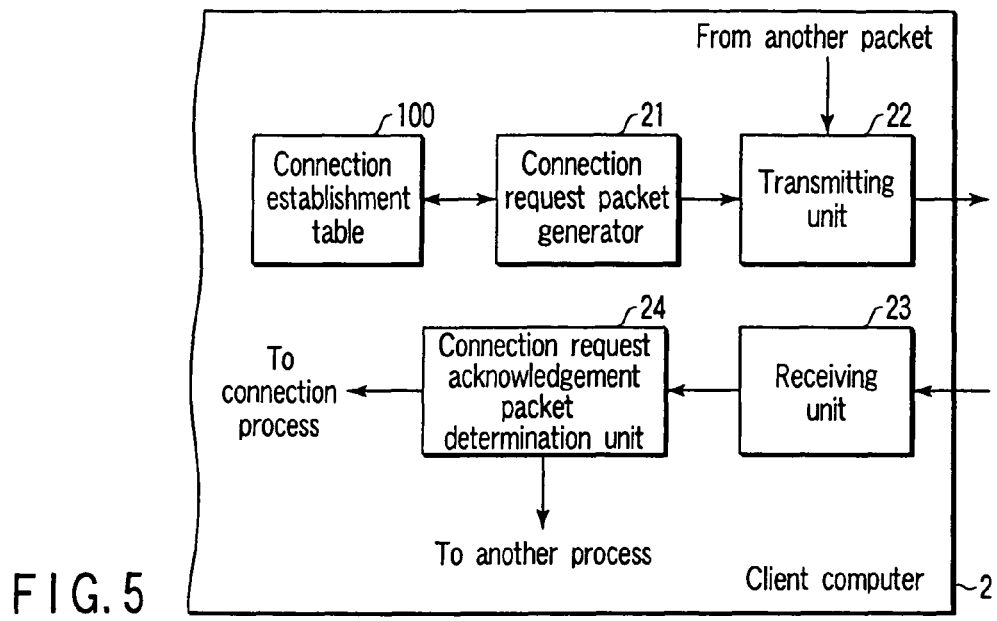
FIG. 5 is a block diagram illustrating function blocks incorporated in a client computer 2 according to a first embodiment of the invention.

FIG. 5 shows the function blocks of each client computer 2 appearing in FIG. 1, which are related to the first embodiment of the invention.

As shown, a connection request packet generator 21 generates a SYN packet upon receiving, from a connection requester via a user interface (not shown), an instruction to request a connection to a certain server computer 1. Subsequently, the connection request packet generator 21 refers to the connection establishment table 100, acquires information on the number of transmissions of a SYN packet, needed for the connection to the designated server computer 1, and outputs the generated SYN packet to a transmitting unit 22 a number of times corresponding to the acquired number of transmissions. In general, an access port with No. 80 is used for transmitting a SYN packet to a certain server computer 1. Therefore, in the first embodiment, too, an access port with No. 80 is used. It is a matter of course that if there is an agreement in which an access port with No. M is used instead of the access port with No. 80, the access port with No. M is used. Further, an agreement may be set so that a plurality of access ports are accessed in order in units of a predetermined number of ports.

The connection establishment table 100 at least holds information on the number of transmissions of a SYN packet needed for the connection requester to establish a connection to each server computer 1. FIG. 7A shows an example of the connection establishment table 100. As shown, the table 100 is a list in which server computers 1 with names A, B, . . . are made to correspond to respective secret information items on the respective predetermined numbers of SYN packets (the respective predetermined numbers of transmissions of a SYN packet) commonly used as secret information between the server computers 1 and a certain connection requester. As described above, it is important to manage the numbers of transmissions secretly. Instead of providing the connection establishment table 100, each client computer 2 may be constructed such that a connection requester (user) inputs, via a user interface (not shown), information, such as the number of transmissions, necessary to generate a SYN packet.

In each client computer 2, the transmitting unit 22 is used to transmit IP packets to the network 3. This unit sequentially transmits, to the network 3, SYN packets sequentially output from the connection request packet generator 21.

A receiving unit 23 receives an IP packet transferred from the network 3. The unit 23 transmits the received IP packet to a connection request acknowledgement packet (SYN+ACK packet) determination unit 24, where it is determined whether the IP packet is a connection request acknowledgement packet (SYN+ACK packet) returned in response to any one of the SYN packets transmitted from the transmitting unit 22. If the IP packet is the SYN+ACK packet, the client computer 2 performs processing for establishing a connection to the target server computer 1.

Figure 6:
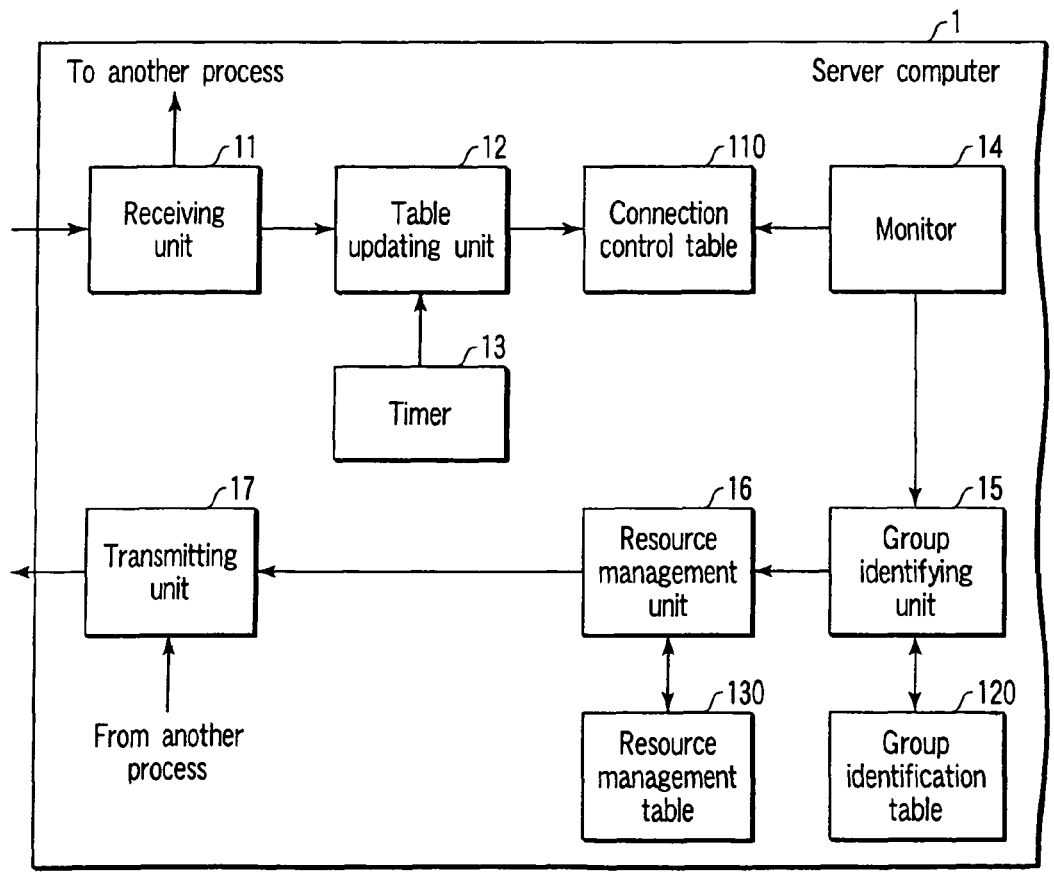
FIG. 6 is a block diagram illustrating function blocks incorporated in a server computer 1 according to the first embodiment.

FIG. 6 shows the function blocks of each server computer 1 that are related to the first embodiment.

In each server computer 1, a receiving unit 11 receives an IP packet transferred from the network 3, and sends it to a table-updating unit 12 if the IP packet is a SYN packet.

The table-updating unit 12 makes, into a connection control table 110, an entry of the packet currently subjected to connection establishing processing, or updates the packet in the table 110. FIG. 7B shows an example of the connection control table 110. The connection control table 110 temporarily holds the entries currently subjected to connection establishment processing. Each entry includes the identification (e.g., client computer IP address) of a connection requester, the total number of SYN packets transmitted by the connection requester so far from the start of connection establishment and received by the server computer 1, and the time having elapsed from the start of the authentication process by the requester.

If the same entry as that of the client computer 2 indicated by the received SYN packet is already made in the connection control table 110, the table-updating unit 12 increments, by one, the number of packet receptions corresponding to the entry, to update the entry. On the other hand, if no entry of the present SYN packet is made in the connection control table 110, a new entry is added. At this time, information (e.g., client name, Source IP address, etc.) is held, from which the client computer 2 having transmitted this packet is discriminated. Further, "1" is input as the number of receptions of this packet, and "0" is input as the elapsed time.

The table-updating unit 12 is connected to a timer 13, thereby updating the elapsed time column of each entry in the connection control table 110 at regular intervals (e.g. every one second), using the timer 13. Thus, the elapsed time column of each entry indicates the time having elapsed so far from the reception of the first packet.

A monitor 14 monitors at regular intervals (e.g., every one second) whether the elapsed time column of each entry temporarily made in the connection control table 110 indicates a predetermined time. If there is an entry whose elapsed time column indicates the predetermined time, this entry is read and eliminated from the connection control table 110. The monitor 14 transmits the read entry to a group identifying unit 15.

The group identifying unit 15 identifies whether information concerning the number of received SYN packets, included in the received entry, is held in a group identification table 120. If it is identified that the information is held, the group identifying unit 15 acquires, from the table 120, authentication information indicating the group corresponding to the number information, and transmits the authentication information to a resource management unit 16, together with the entry. FIG. 7C shows an example of the group identification table 120. As shown, the table 120 is a list in which the numbers of packets uniquely assigned to respective groups are made to correspond to group identification information items (in the embodiment, these items are group names, but may be group IDs instead).

The resource management unit 16 refers to a resource management table 130 to confirm, based on the received group identification information, the status of the resources that can be allocated to the group. FIG. 7D shows an example of the resource management table 130. As shown, the table 130 is a list in which group names (information for identifying groups), the number of connections that can be simultaneously established for each group, and the number of connections that are currently established in each group are made to correspond to each other. The number of connections that can be simultaneously established for each group is determined from the resources that can simultaneously be allocated to each group. When the resource management unit 16 refers to the resource management table 130 and finds resources that can be allocated, it increments, by one, the value as an entry in the column of the table 130 indicating the number of connections currently established for the present group. After that, to establish a connection, the resource management unit 16 generates a SYN+ACK packet for one of SYN packets transmitted from client computers 2 that belong to the group, and transmits it to a transmitting unit 17. When a connection in a certain group is finished, the resource management unit 16 receives a report indicating this, and decrements, by one, the value as an entry in the column of the table 130 indicating the number of connections currently established for the certain group. Concerning a SYN packet in response to which a SYN+ACK packet is returned, there is a case where it is preset between each client computer 2 and each server computer 1 that a SYN+ACK packet is returned in response to the Nth SYN packet. Alternatively, there is another case where each server computer performs such determination each time it receives a SYN packet. In the first embodiment, it is assumed that a SYN+ACK packet is returned in response to the last SYN packet.

The transmitting unit 17 transfers, to the network 3, the SYN+ACK packet output from the resource management unit 16. The SYN+ACK packet is then received by the previously described receiving unit 23 of the client computer 2.

Figure 8:
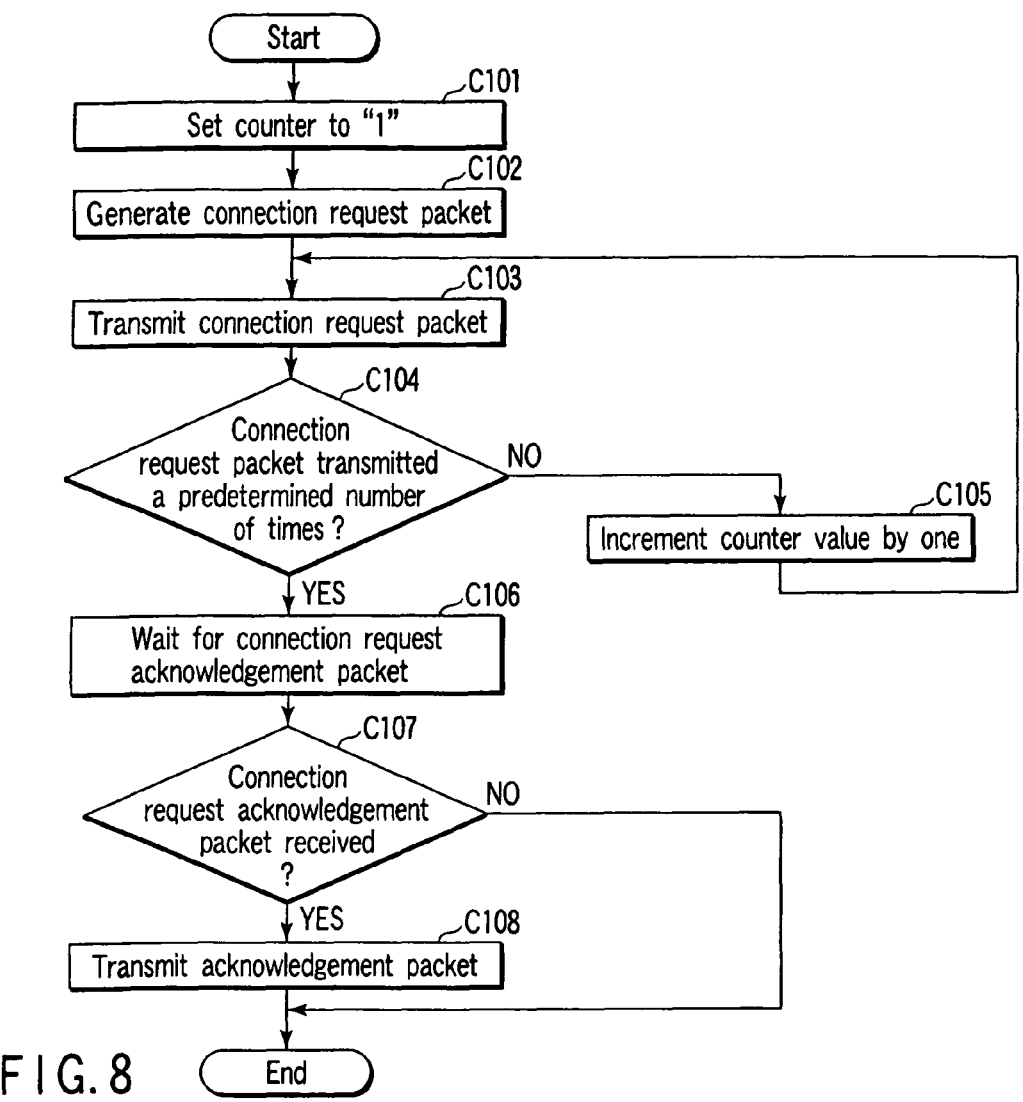
FIG. 8 is a flowchart useful in explaining the operation of the client computer 2 of the first embodiment.

Referring to FIG. 8, the operation of the client computer 2 of the embodiment will be described. Similarly, referring to FIGS. 9 and 10, the operation of the server computer 1 will be described.

When a connection requester instructs the client computer 2 to establish a connection to the server computer 1, the connection request packet generator 21 of the client computer 2 sets "1" as an initial value in a counter (not shown) incorporated therein (step C101) for counting the number of connections through which a SYN packet is already transmitted. Subsequently, the connection request packet generator 21 generates a SYN packet to the server computer (step C102). The generated SYN packet is output to the network 3 via the transmitting unit 22 (step C103).

The connection request packet generator 21 refers to the predetermined number of SYN packets held as the entry of the server computer 1 in the connection establishment table 100, compares it with the count value of the counter, and determines whether the predetermined number of SYN packets have been transmitted (step C104).

If the number of transmitted SYN packets does not reach the predetermined value, the count value of the counter is incremented by one (step C105), and the process is returned to step C103, thereby re-transmitting the same SYN packet.

On the other hand, if it is determined at step C104 that the predetermined number of SYN packets have been transmitted, the client computer 2 waits for a SYN+ACK packet transmitted from the server computer 1 (step C106). Thereafter, the client computer 2 determines whether a SYN+ACK packet is transmitted from the server computer 1 within a preset time (step C107). More specifically, the IP packet received by the receiving unit 23 is sent to the SYN+ACK packet determination unit 24, where it is determined whether the IP packet is a SYN+ACK packet transmitted from the server computer 1. The unit 24 performs this operation for a predetermined period at least after the predetermined number of SYN packets are transmitted.

If no SYN+ACK packet is received for the predetermined period, it is determined that authentication has failed, thereby finishing authentication processing.

If, on the other hand, a SYN+ACK packet corresponding to at least one of the SYN packets is received from the server computer 1, the client computer 2 transmits an acknowledgement packet (ACK packet) to the server computer 1 (step C108). As a result, a connection is established between the client computer 2 and server computer 1.

The server computer 1 mainly performs an operation related to reception of a SYN packet, and an operation related to transmission of a SYN+ACK packet.

Figure 9:
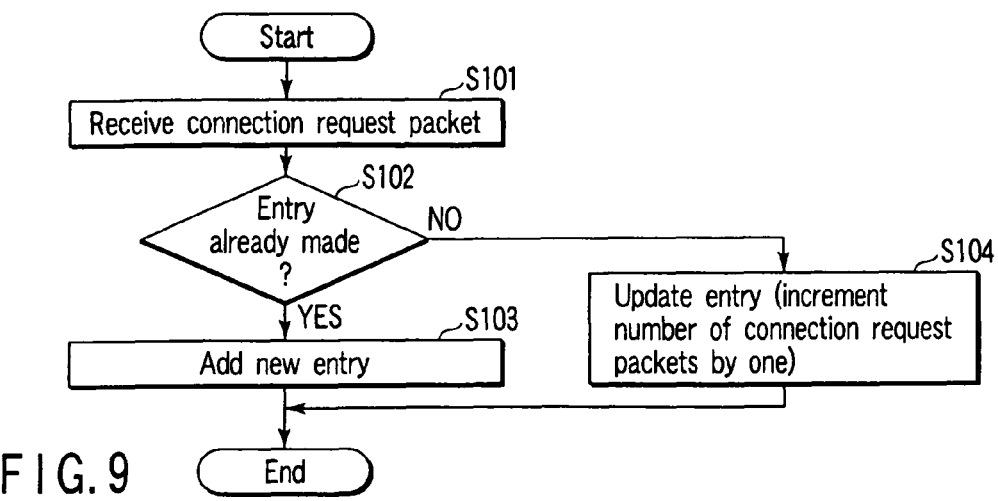
FIG. 9 is a flowchart useful in explaining the operation of the server computer 1 of the first embodiment performed when receiving a SYN packet.

Firstly, the operation related to reception of a SYN packet will be described with reference to FIG. 9. When the receiving unit 11 of the server computer 1 has received a SYN packet from the client computer 2, it sends the packet to the table-updating unit 12 (step S101).

The table-updating unit 12 detects whether the same entry as that requested by the connection requester is already made in the connection control table 110 (step S102). In this embodiment, to discriminate the entries in the connection control table 110, IP addresses are used. However, MAC addresses or other identifications may be utilized.

If it is determined at step S102 that there is no such entry in the connection control table 110, the entry of the SYN packet transmitted from the client computer 2 is newly made into the table 110 (step S103). Concerning the new entry, 1 is set as the initial values of the IP address and the number of SYN packets, and 0 is set as the initial value of the elapsed time column.

On the other hand, if it is determined at step S102 that the connection control table 110 already holds an entry of a SYN packet transmitted from the client computer 2, the number of SYN packets included in the entry (which has the same IP address as the client computer 2) is incremented by one, updating the table (step S104).

Assume here that the elapsed time column of each entry made in the table 110 is updated by the table-updating table 12 at regular intervals measured by the timer 13, although this is not illustrated in the flowchart.

Figure 10:
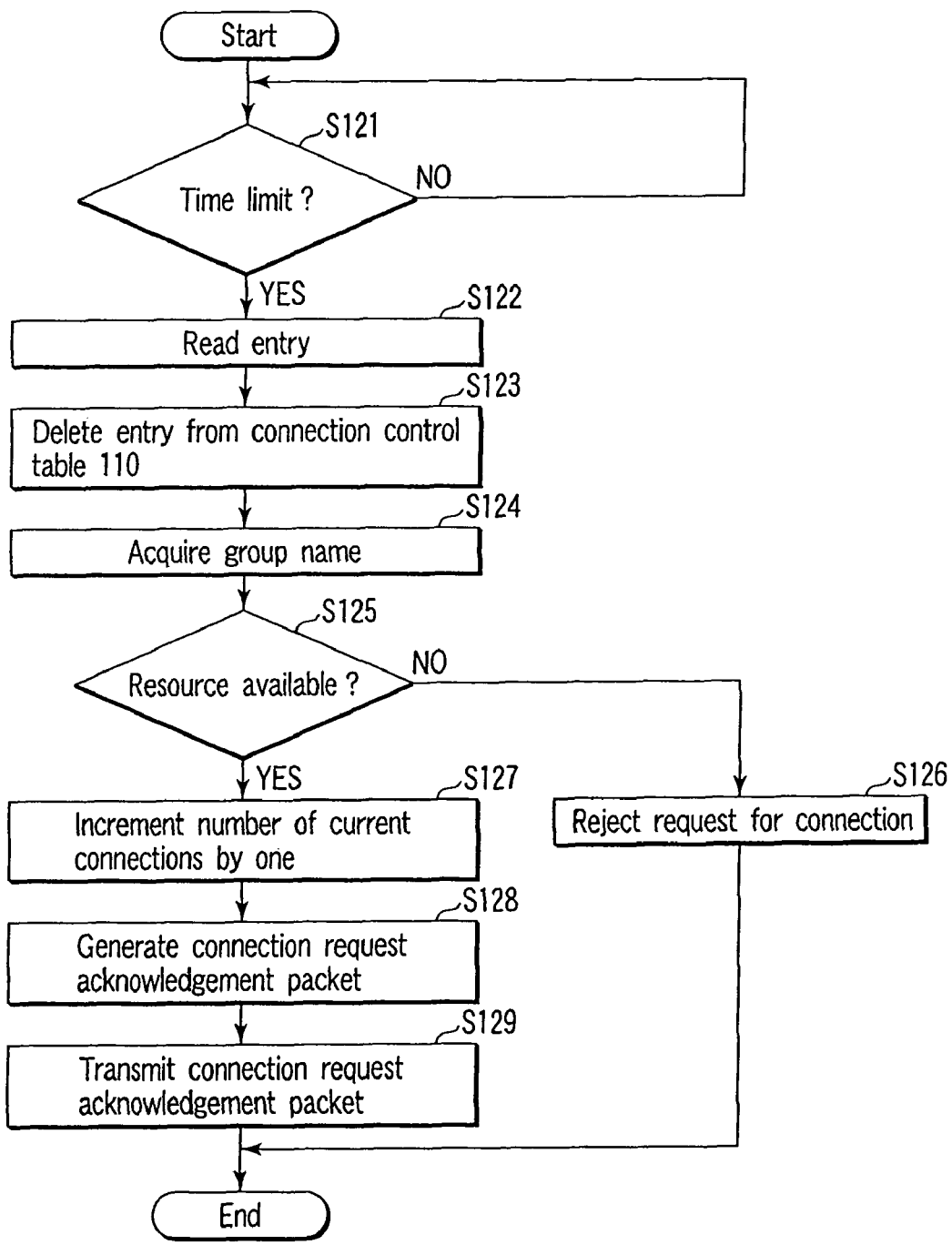
FIG. 10 is a flowchart useful in explaining the operation of the server computer 1 performed when transmitting a SYN+ACK packet.

Referring then to FIG. 10, the operation related to the transmission of a SYN+ACK packet will be described.

The monitor 14 always monitors whether the elapsed time column of at least one entry in the connection control table 110 indicates a preset limit time (step S121). If it is determined that there is an elapsed time column indicating the preset limit time, the monitor 14 reads and sends it to the group identifying unit 15 (step S122). Further, the monitor 14 deletes the entry from the connection control table 110 (step S123).

The group identifying unit 15 refers to the group identification table 120 to identify whether the table 120 holds the same number of packets as that held in the received entry. If the table 120 holds the same number of packets, the group identifying unit 15 acquires a group name (identification information indicating a group) corresponding thereto (step S124). In, for example, FIG. 7C, if the number of SYN packets from a connection requester is 800, it is determined that the requester belongs to group 1. Although in the embodiment, the number of SYN packets is set to a certain value, it may be set to fall within a certain range (e.g., within a range of from 800 or more to less than 820; within a range of 800 or more). The group identifying unit 15 sends the entry and acquired group name to the resource management unit 16.

The resource management unit 16 refers to the resource management table 130 to confirm whether resources assigned to the group for connection processing remain (step S125). This process is performed by referring to the entry with the group name and confirming the number of connections currently established, and the allowable maximum number of connections. More specifically, it is confirmed whether the number of current connections does not exceed the allowable maximum number of connections even if it is incremented by one. In the embodiment, it is confirmed whether available resources remain, from the number of current connections acquired by referring to the entry. However, this may be modified such that a field may be prepared and referred to, which indicates whether available resources remain for each entry in the resource management table, and which is always updated.

If no resources remain, the resource management unit 16 rejects the request for connection (step S126), and terminates the process. On the other hand, if remaining resources are confirmed, the resource management unit 16 increments, by one, the number of current connections in the resource management table 130 to update the state of resource use (step S127).

The resource management unit 16 generates a SYN+ACK packet in response to the last SYN packet output from the client computer 2 (S128), and sends it to the network 3 via the transmitting unit 17 (S129). As described above, although in the embodiment, a SYN+ACK packet is generated in response to the last SYN packet, generation of a SYN+ACK packet in response to any arbitrary SYN packet can be realized by various methods.

In the above-described embodiment, for the identified user group, whether resources for connection processing remain is confirmed, and then connection establishment processing is executed. Therefore, connection requesters of lower priority cannot establish connections using the resources allocated to user groups of higher priority. As a result, connection flood by clients of low priority, or occupation of services by connection requesters of low priority can be avoided, thereby further enhancing the security of server computers.

Secret information, concerning the number of transmissions of a request, commonly used between each client computer 2 and server computer 1 can be utilized in an authentication method with a higher resistance against attacks, if it is combined with another type of use or information.

In the description below, various authentication methods will be exemplified, and the operations of the client computer 2 and server computer 1 performed for realizing the methods will be described.

FIRST EXAMPLE

In a first example, a secret agreement in which an access port with No. M is used for transmitting a SYN packet, instead of a generally used access port with No. 80 is made between a connection requester and a server computer 1, and identification is executed using commonly used secret information concerning the number of transmissions of a request and the access port number M. It is sufficient if this port number is held in both the connection establishment table 100 and group identification table 120. However, instead of storing it in the connection establishment table 100, a connection requester may input it (as input of a password). Further, in the group identification table 120, secret access port numbers corresponding to the connection requesters of each group may be arranged as one entry. Alternatively, respective entries may be provided for the connection requesters. Yet alternatively, a common access port number may be used by the connection requesters belonging to the same group. In this case, each entry of the connection control table 110 records the access port number of a SYN packet transmitted. The group identifying unit 15 identifies whether there exist entries that record the same number of requests and the same access port number. If there exit such entries, the group identifying unit 15 acquires the group identification information corresponding to the entries.

Furthermore, if a plurality of access port numbers are used, and information indicating a combination of each of the access port numbers and a predetermined number of SYN packets is commonly used as secret information for authentication, then a securer authentication method is realized. In other respects, the authentication method can be improved. Since such improvements can be easily achieved, no further descriptions will be given thereof.

In addition to the use of an access port number, the manner of commonly using, as secret information, each data item of the header of a SYN packet is, of course, possible. For instance, other field values, such as the sequence number of a TCP header, a SYN+ACK number, reserved bit, total length, etc., can be utilized as secret information. In particular, sequence numbers are suitable as secret data since they are generally determined randomly by transmitters when the transmitters generate a SYN or SYN+ACK packet.

Furthermore, it is not always necessary to use data in the header of a SYN packet, but another type of information defined between the server computer 1 and client computer 2 may be used as secret common information. In this case, it is sufficient if this information is written in the data field of a SYN packet. Moreover, common secret information or different secret information may be used for SYN packets.

In the first example constructed as above, if an illegitimate user pretends to belong to a user group, they must estimate, as well as the number of SYN packets, the access port number, each data of the header of a SYN packet, another type of secret information, etc. This makes it much more difficult to enable illegitimate users to pass through authentication processing. Thus, the security of the server computer 1 is much more enhanced.

SECOND EXAMPLE

In a second example, the time interval at which SYN packets are transmitted is preset secretly, and identification is executed based on the number of transmissions of a SYN packet and the reception interval of the SYN packet. The information concerning the time interval is held in the connection establishment table 100 and group identification table 120. Further, an additional data area is imparted to the connection control table 110, where the time elapsing from the preceding SYN packet or from the first SYN packet is recorded each time a SYN packet is received. The group identifying unit 15 determines whether each of the recorded elapsed times is identical to the time interval. Actually, however, variations exist in delay during communication. In light of this, it is necessary to impart a certain time width to the time interval held in the group identification table 120, compared to the time interval for transmission. As in the first example, different time intervals may be set for different connection requesters, or a common time interval may be set for each group.

To perform illegal access by passing through the authentication process in the above-described second example, it is necessary to estimate the access time interval as well as the number of SYN packets. This being so, the security of the server is further enhanced.

THIRD EXAMPLE

In a third example, the type of each connection request packet is defined and used as secret information for authentication, as well as the number of SYN packets.

In the previously described first embodiment, the client computer 2 transmits at least one TCP/SYN packet to the server computer 1 to acquire a SYN+ACK packet therefrom. The other connection request packets may be formed of ICMP packets, UDP packets, as well as SYN packets.

In light of the above, in the third example, the types of connection request packets are preset between the client computer 2 and sever computer 1, as well as the number of connection request packets. The preset types of packets are arranged in the connection establishment table 100 and group identification table 120, and each entry in the connection control table 110 records the type (UDP/TCP/ICMP) of a connection request packet actually transmitted. If, for example, it is determined whether the number of packets of the same type transmitted is identical to the corresponding preset number, more reliable authentication is realized. In other respects, the authentication method can be improved. Since such improvements can be easily achieved, no further descriptions will be given thereof. As aforementioned, since a connection request acknowledgement packet ((SYN+ACK) packet) is transmitted in response to a TCP/SYN packet, at least one SYN packet must be included in the connection request packets. Further, as in the first and second examples, different types of packets may be set for different connection requesters, or a common type of packets may be set for each group.

To perform illegal access by passing through the authentication process employed in the above-described third example, it is necessary to estimate the type of each packet as well as the number of connection request packets. This being so, the security of the server is further enhanced.

If each information item used for authentication in the first embodiment and the first to third examples is changed between the server computer 1 and client computer 2 by, for example, a synchronized one-time password technique, the security of the server computer 1 is much more enhanced.

Second Embodiment

A second embodiment will now be described in detail.

Figure 11:
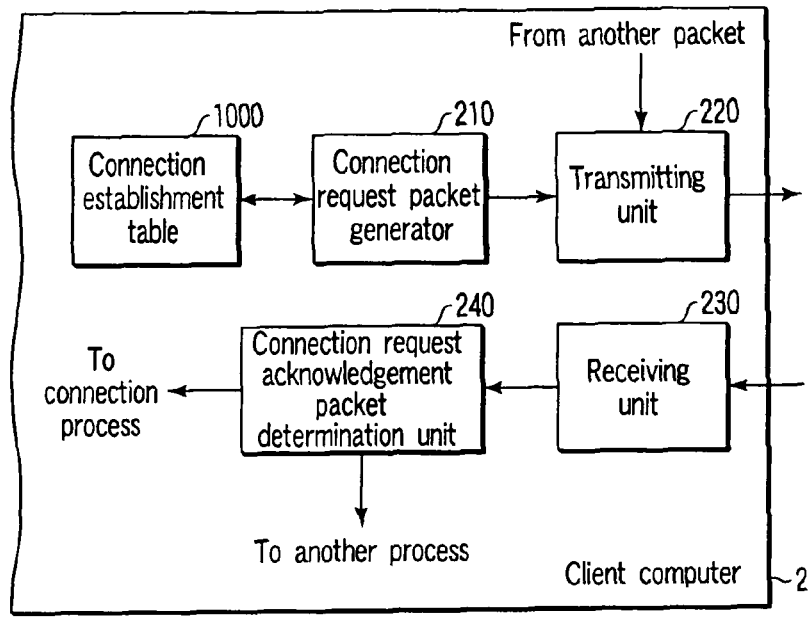
FIG. 11 is a block diagram illustrating function blocks incorporated in a client computer 2 according to a second embodiment of the invention.

FIG. 11 is a block diagram illustrating essential function blocks incorporated in a client computer 2 according to a second embodiment of the invention.

As shown, a connection request packet generator 210 generates a connection request packet upon receiving, from a connection requester, an instruction to request a connection to a certain server computer 1. Subsequently, the connection request packet generator 210 refers to a connection establishment table 1000, acquires information on numbers assigned to authentication ports used for the connection to the server computer 1, and sequentially generates a connection request packet corresponding to each authentication port number. The connection establishment table 1000 holds at least authentication port numbers that are commonly used as secret information between the server computer 1 and client computer 2. Common use of the authentication port numbers may be realized, kept secret from a third party, using an on-line system in which a channel secured by a cipher protocol (provided by, for example, a secure socket layer (SSL) technique) is utilized, or using an off-line system such as mailing. Further, each connection requester may hold different criteria for different servers.

In the client computer 2, a transmitting unit 220 is used to transmit IP packets to a network 3. This unit sequentially transmits, to the network 3, connection request packets sequentially output from the connection request packet generator 210.

A receiving unit 230 receives an IP packet transferred from the network 3. The unit 230 transmits the received IP packet to a connection request acknowledgement packet determination unit 240, where it is determined whether the IP packet is a connection request acknowledgement packet returned in response to any one of the connection request packets transmitted from the transmitting unit 220. If the IP packet is the connection request acknowledgement packet, the client computer 2 performs processing for establishing a connection to the target server computer 1.

Figure 12:
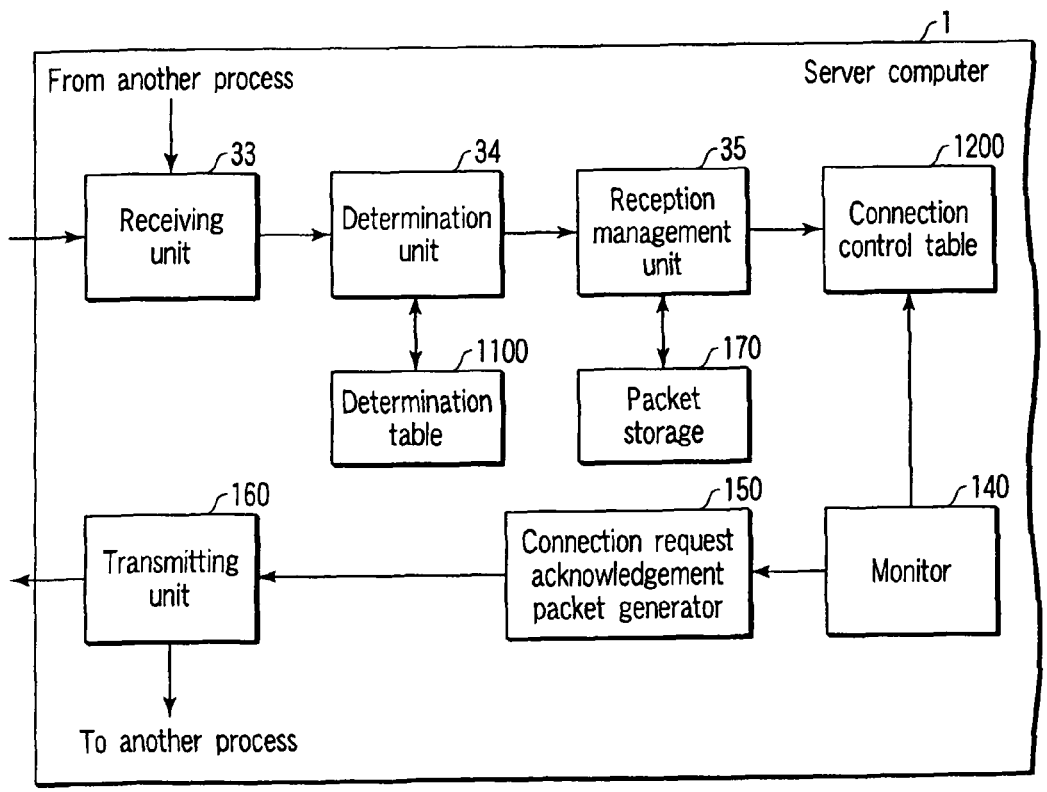
FIG. 12 is a view illustrating function blocks incorporated in a server computer 1 according to the second embodiment of the invention.

FIG. 12 shows the function blocks of each server computer 1 that are related to the first embodiment.

In each server computer 1, a receiving unit 33 receives an IP packet transferred from the network 3. If the IP packet received by the receiving unit 33 is a connection request packet, a determination unit 34 refers to a determination table 1100 that holds access pattern information at least including authentication port numbers, thereby determining whether the transmitter of the connection request packet (connection requester) is a legitimate one. As aforementioned, the authentication port numbers are commonly used as secret information between each client computer 2 and server computer 1. If the number of authentication ports or the authentication port number is set for each client computer 2, the determination table 1100 may hold an entry for each client computer 2.

If it is determined that the connection requester is a legitimate one, a reception management unit 35 temporarily stores the received connection request packet in packet storage 170. At the same time, the unit 35 makes an entry of information that includes information (e.g., a source IP address) for identifying the client computer 2 from which the connection request packet is sent to a connection control table 1200, and a destination port number, i.e., the port number (=authentication port number) used in the present server computer designated by the client computer 2. If the connection control table 1200 already holds an entry of the information for identifying the client computer 2, it is sufficient if the destination port number is added to the existing entry. On the other hand, if there is no such entry, a new entry for the information is added.

A monitor 140 monitors whether each entry in the connection control table 1200 satisfies the conditions for establishing a connection. The conditions mean that the access pattern information for each client computer 2 arranged in the determination table 1100 is completely satisfied. If the conditions for establishing a connection are satisfied, the monitor 140 informs a connection request acknowledgement packet generator 150 of this.

Upon receiving the information that the conditions for establishing a connection are satisfied, the connection request acknowledgement packet generator 150 refers to only a predetermined one of the connection request packets transmitted from the client computer 2 and stored in the packet storage 170, thereby generating a connection request acknowledgement packet for response. After generating the connection request acknowledgement packet, the generator 150 deletes, from the packet storage 170, all connection request packets transmitted from the client computer 2.

A transmitting unit 160 transmits, to the network 3, the connection request acknowledgement packet generated by the connection request acknowledgement packet generator 150. The transmitted connection request acknowledgement packet is received by the above-described receiving unit 33 of the client computer 2.

The authentication port numbers commonly used between the client computer 2 and server computer 1 may be used alone or combined with another type of information to realize various authentication methods.

Various authentication methods will be exemplified below, and the operations of the client computer 2 and server computer 1 performed in each method will be described.

(First Modification of the Second Embodiment)

Firstly, a description will be given of a case where identification is performed using only authentication port numbers.

FIGS. 13A, 13B and 13C show a connection establishment table 1010, determination table 1110 and connection control table 1210 employed in the first modification.

The connection establishment table 1010 holds server names for discriminating server computers 1 that perform authentication, in relation to respective combinations of port numbers needed for authentication. As previously explained, each authentication port number in the table is commonly used as secret information between a certain client computer 2 and each server computer 1.

The determination table 1110 holds a combination of port numbers necessary for identifying a client computer 2 when it is connected to a certain server computer 1. Each authentication port number is commonly used as secret information between client computers 2 and the server computer 1. In this table example, a common combination of authentication port numbers is used for all client computers 2. However, different combinations of authentication port numbers may be used for different client computers 2. In this case, different combinations of authentication port numbers are held in relation to identification information for identifying respective client computers 2.

The connection control table 1210 shows the status of processing currently performed by each client computer 2 for establishing a connection to a certain server computer 1. Each time a client computer 2 accesses the server computer 1 using a legitimate port number, the table 1210 holds the port number in relation to identification information for identifying the client computer 2.

Figure 14:
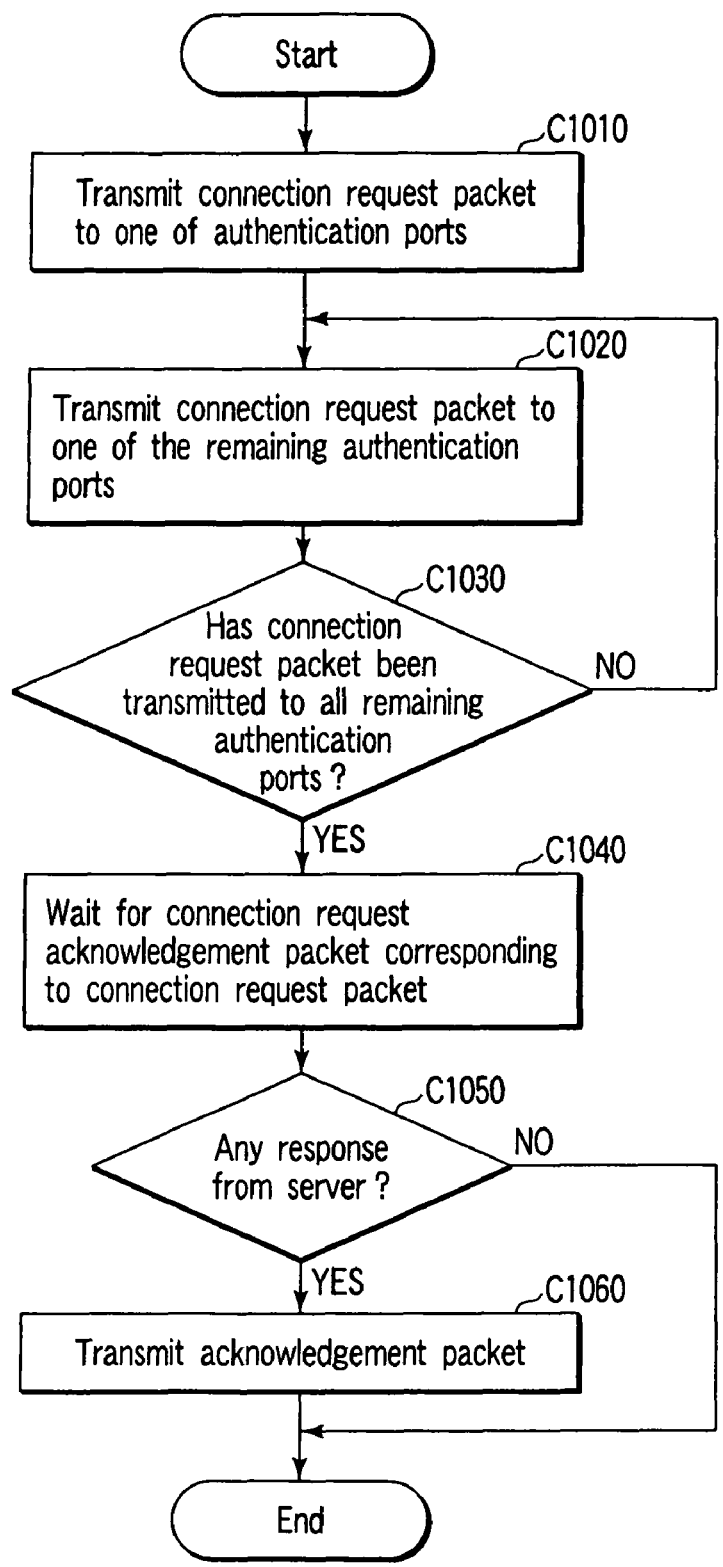
FIG. 14 is a flowchart useful in explaining the procedure of processing performed by the client computer 2 in the first modification of the second embodiment.
Figure 15:
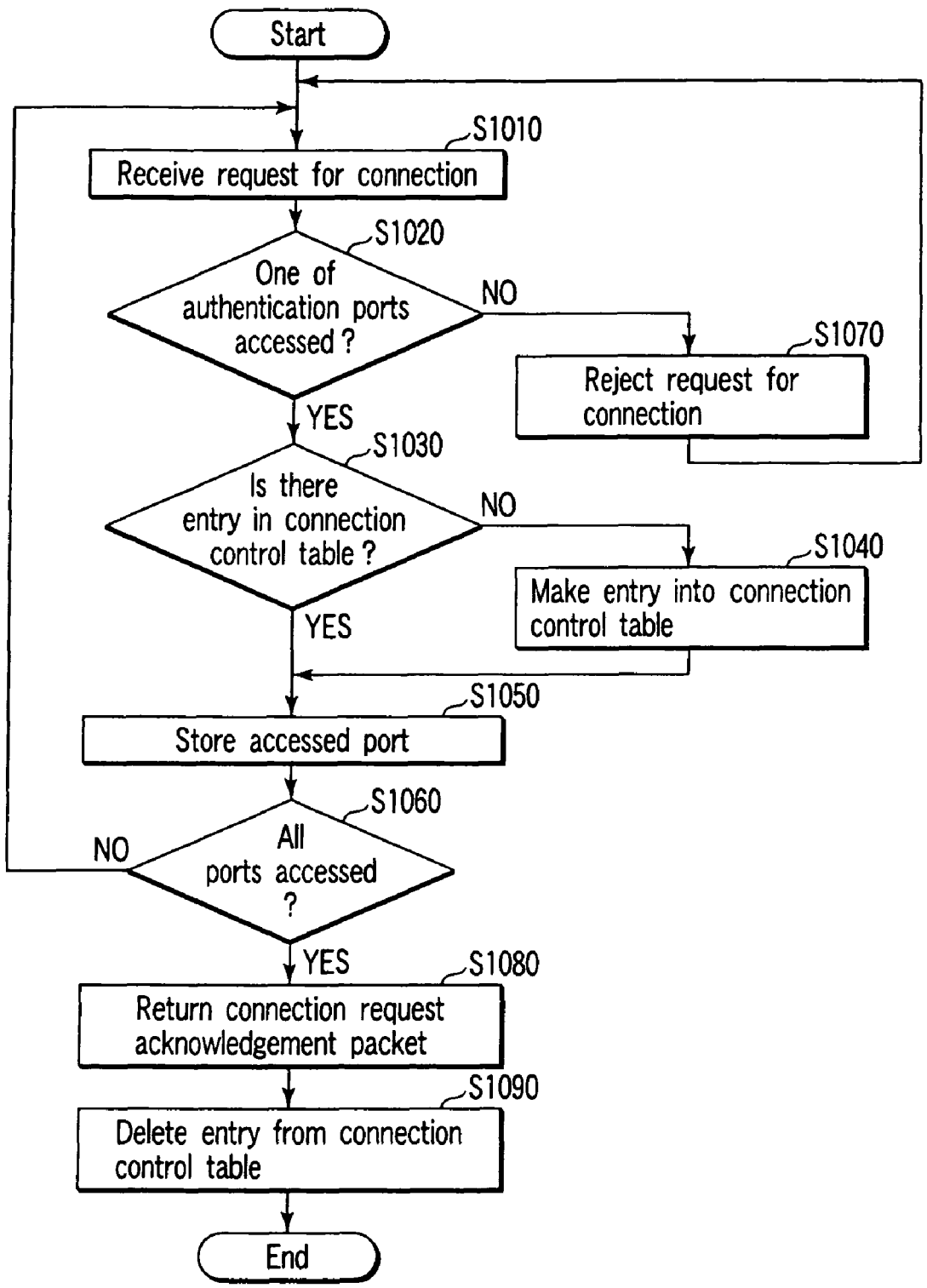
FIG. 15 is a flowchart useful in explaining the procedure of processing performed by the server computer 1 in the first modification of the second embodiment.

FIG. 14 is a flowchart useful in explaining the procedure of processing performed by each client computer 2, and FIG. 15 is a flowchart useful in explaining the procedure of processing performed by each server computer 1. Referring first to FIG. 14, the procedure of processing by each client computer 2 will be described.

When a certain client computer 2 establishes a connection to a certain server computer 1, the connection request packet generator 210 of the computer 2 refers to the connection establishment table 1010, thereby generating a connection request packet corresponding to one of the authentication ports. The transmitting unit 220 transmits the packet to the one authentication port (step C1010).

Subsequently, the connection request packet generator 210 again refers to the connection establishment table 1010, whereby a connection request packet is transmitted to an authentication port, to which it is not yet transmitted (step C1020). After that, the connection request packet generator 210 refers to the connection establishment table 1010 and determines whether a connection request packet is transmitted to all authentication ports (step C1030).

If there remains an authentication port to which a connection request packet is not yet transmitted, a connection request packet is transmitted thereto (step C1020). If, on the other hand, it is determined that all authentication ports have received a connection request packet, the client computer 2 waits for a connection request acknowledgement packet from the server computer 1 (step C1040).

The client computer 2 determines whether there is a response from the server computer 1 (step C1050). If there is no response, the client computer 2 determines that authentication has failed, thereby finishing the process. If, on the other hand, the client computer 2 has received, from the server computer 1, a connection request acknowledgement packet corresponding to one of the connection request packets, it transmits an acknowledgement packet to the server computer 1 (step C1060). As a result, a connection is established between the client computer 2 and server computer 1.

Referring then to FIG. 15, the procedure of processing by the server computer 1 will be described.

When the server computer 1 has received a connection request packet using the receiving unit 33 (step S1010), it refers to the determination table 1110 to determine whether the destination port number of the connection request packet is included in the authentication port numbers (step S1020). When different port number combinations are used for different client computers 2, determination is performed by specifying the client computer 2 based on, for example, the source IP address of the connection request packet, and then referring to the entry in the determination table 1110, which corresponds to the specified client computer 2.

If the destination of the connection request packet is none of the authentication ports, the server computer 1 rejects the connection request packet and waits for the next connection request packet (step S1070).

If it is determined that the destination of the connection request packet is one of the authentication ports, the connection request packet is temporarily stored in the packet storage 170. Then, the server computer 1 refers to the connection control table 1210, and determines whether there is an entry corresponding to the connection requester (step S1030). In the connection control table 1210 employed in the embodiment, the information for identifying the connection requester is set to the IP address of the client computer. However, the MAC address or another identification may be used instead of the IP address. In other words, it is sufficient if the information can be used to identify the connection requester during the authentication process. If the connection control table 1210 does not hold an entry of the connection requester, an entry for the connection requester is added (step S1040).

After that, the number assigned to the authentication port, to which the connection request packet is transmitted, is held in the entry of the connection control table 1210 corresponding to the client computer 2 (step S1050).

The monitor 140 refers to the connection control table 1210 and determination table 1110, thereby determining whether a connection request packet is transmitted to all authentication ports (step S1060).

If a port number assigned to an authentication port, to which a connection request packet is not yet transmitted, remains, the server computer 1 waits for another connection request packet (step S1010). On the other hand, if it is determined that a connection request packet is transmitted from the client computer 2 to all authentication ports, the acknowledgement packet generator 150 generates a connection request acknowledgement packet corresponding to one of the connection request packets from the client computer 2. A transmitting unit 160 transmits the generated packet to the network 3 (step S1080).

The one of the connection request packets, in response to which a connection request acknowledgement packet should be returned, can be determined in the following manners:

1) A connection request acknowledgement packet is returned in response to the last connection request packet;

2) When a connection request packet is sent to an authentication port with a predetermined port number, an acknowledgement packet is returned; and 3) When the nth (n is a preset number) connection request packet is received, an acknowledgement packet is returned.

At step S1030, all connection request packets are stored in packet storage 170. However, if one of the above manners 1) to 3) is employed, it is sufficient if only a target connection request packet is stored in the storage. Therefore, the capacity of the packet storage 170 can be reduced.

If one of the above manners of returning a connection request acknowledgement packet is commonly utilized between the server computer 1 and client computer 2, it is sufficient if the client computer 2 waits for a connection request acknowledgement packet transmitted from the server computer 1 in response to a particular one of the connection request packets. This can reduce the processing resources required in the client computer 2.

A description will be again given of the processing procedure of the server computer 1.

After a connection request acknowledgement packet is transmitted at step S1080, the connection request packet and entry of the connection requester stored in the packet storage 170 and connection control table 1210, respectively, are deleted therefrom (step S1090).

After that, the server computer 1 receives an acknowledgement packet from the connection requester, whereby a connection is established therebetween to enable communication between the applications of the client computer 2 and server computer 1.

This modification of the second embodiment can protect a server computer from the attack, by an illegitimate client who does not the authentication ports, of establishing a connection to the server computer by forging the IP address of a successfully identified client computer. Thus, authentication can be executed, which is enhanced in safety compared to the prior art.

In this modification, authentication port numbers contained in a plurality of connection request packets are used as secret information. However, instead of each authentication port number, data contained in a header field other than the port number field, which does not raise any problems in general communication, could be used as secret information. For instance, the sequence number of the TCP header, acknowledgement number, reserved bit, total length, etc. may be used as secret information.

(Second Modification of the Second Embodiment)

A description will now be given of a case where identification is performed utilizing a plurality of authentication port numbers and their order of access.

FIGS. 16A, 16B, 16C and 16D show a connection establishment table 1020, determination table 1120, connection control table 1220, and newly added order-setting table 1320 connected to the receiving unit 33, which are employed in the second modification.

The connection establishment table 1020 holds server names for discriminating server computers 1 that perform authentication, in relation to respective combinations of port numbers needed for authentication, and the order of access to the port numbers. As previously explained, each authentication port number in the table is commonly used as secret information between a certain client computer 2 and each server computer 1.

The determination table 1120 holds a combination of port numbers necessary for identifying a client computer 2 when it is connected to a certain server computer 1, and the order of access to the port numbers. Each authentication port number is commonly used as secret information between each client computer 2 and the server computer 1. In this table example, a common combination of authentication port numbers and the common order of access are used for all client computers 2. However, different combinations of authentication port numbers may be used for different client computers 2. In this case, different combinations of authentication port numbers are held in relation to identification information for identifying respective client computers 2.

The connection control table 1220 shows the status of processing currently performed by each client computer 2 for establishing a connection to the server computer 1. Each time a client computer 2 accesses the server computer 1 using a legitimate port number, the table 1220 holds this port number in relation to identification information for identifying the client computer 2.

The order-setting table 1320 manages how many times a connection request packet has been received from each client computer 2. Specifically, when a connection request packet is received for the first time from each client computer 2, the order-setting table 1320 holds information "1" indicating the number of receptions, in relation to identification information (e.g., IP address) indicating each client computer 2. Similarly, when the packet is received second time, et seq., the number of receptions is incremented one by one. Thus, the reception information is updated.

Figure 17:
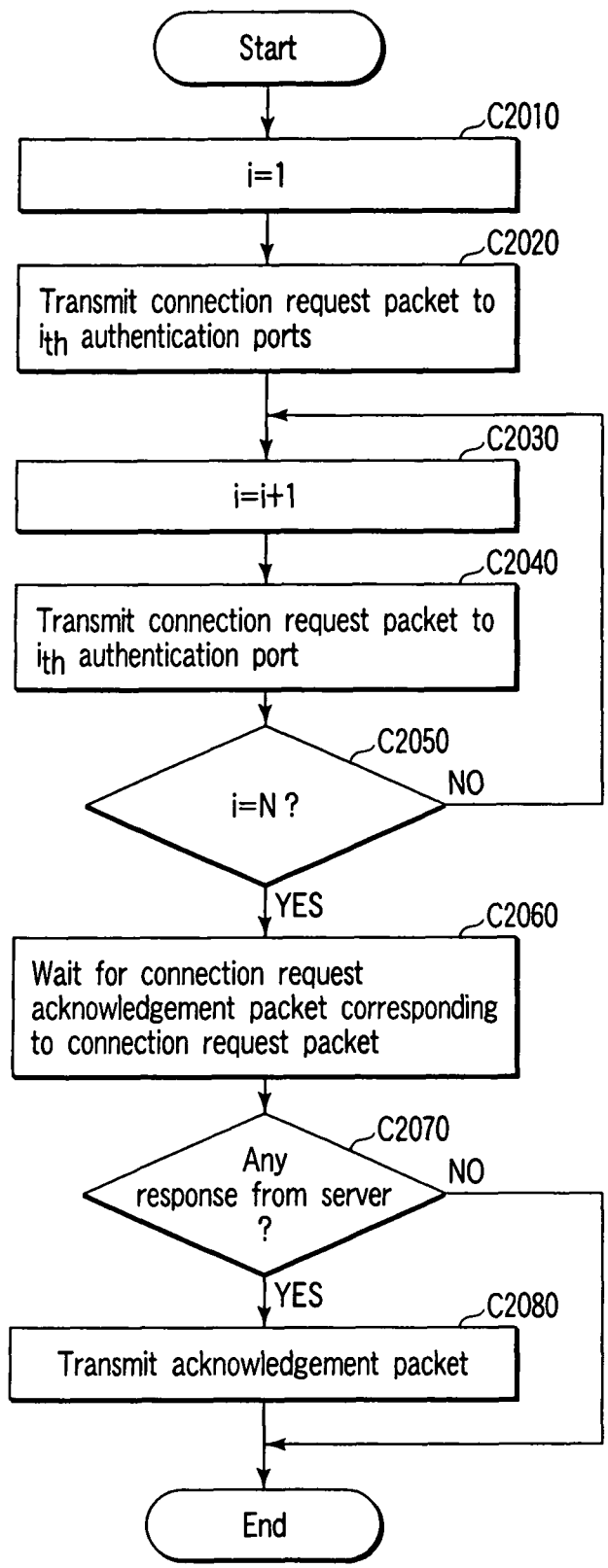
FIG. 17 is a flowchart useful in explaining the procedure of processing performed by the client computer 2 according to the second modification of the second embodiment.
Figure 18:
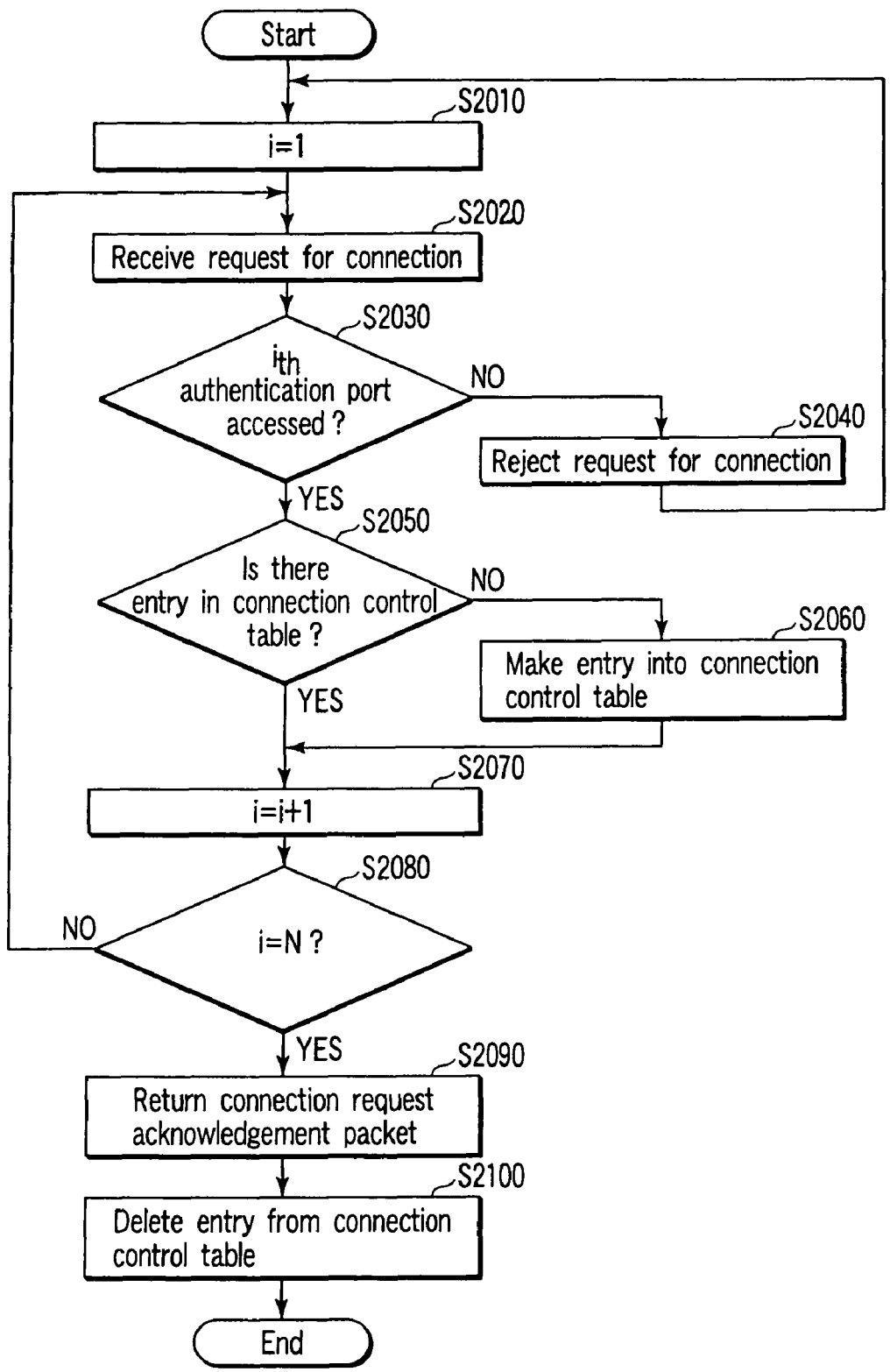
FIG. 18 is a flowchart useful in explaining the procedure of processing performed by the server computer 1 according to the second modification of the second embodiment.

FIG. 17 is a flowchart useful in explaining the procedure of processing performed by each client computer 2, and FIG. 18 is a flowchart useful in explaining the procedure of processing performed by each server computer 1. Referring first to FIG. 17, the processing procedure of each client computer 2 will be described.

When a client computer 2 establishes a connection to a server computer 1, firstly, the connection establishment table 1020 is referred to, thereby transmitting a connection request packet to the 1st (I=1) authentication port (steps C2010, C2020). Subsequently, the value of i is incremented by one, and the connection establishment table 1020 is referred to, thereby transmitting a connection request packet to the 2nd (i=2) authentication port (steps C2030, C2040). Similarly, it is confirmed whether a connection request packet is transmitted to all authentication ports from the 1st to Nth ports by referring to the connection establishment table 1020 (step C2050).

If there remains an authentication port to which a connection request packet is not yet transmitted, the value of i is incremented by one, and a connection request packet is transmitted to the ith authentication port (steps C2030, C2040).

On the other hand, if the client computer 2 confirms that it has transmitted a connection request packet to all authentication ports in a predetermined order, it waits for a connection request acknowledgement packet from the server computer 1 (step C2060).

It is determined whether there is a response from the server computer 1 (step C2070). If there is no response, the client computer 2 determines that authentication has failed, and finishes the authentication process.

On the other hand, if there is a connection request acknowledgement packet, from the server computer 1, which corresponds to one of the transmitted connection request packets, the client computer 2 returns an acknowledgment packet (step C2080). As a result, a connection is established between the client and server computers.

Referring then to FIG. 18, the processing procedure of the server computer will be described.

The server computer 1 receives the ith connection request packet from the client computer 2 (step S2020), while setting to 1, referring to the order-setting table, the variable i that indicates the order of reception of a connection request packet from the client computer 2 (step S2010). Subsequently, the determination table 1120 is referred to determine whether the destination port of the ith connection request packet is the ith authentication port (step S2030).

If the destination port of the ith connection request packet is not the ith authentication port, the server computer 1 rejects this packet, and waits for the next connection request packet (step S2040). If, on the other hand, the destination port of the ith connection request packet is the ith authentication port, the connection control table 1220 is referred to, thereby checking whether there is an entry for the connection requester (step S2050). If the connection control table 1220 does not hold any entry for the connection requester, an entry is added for it (step S2060).

After that, the server computer 1 increments, by one, the variable i indicating the order of reception of the connection request packet (step S2070), and confirms whether all authentication ports have received a connection request packet in a predetermined order (step S2080). If the answer is NO, the server computer 1 receives the ith connection request packet from the client computer 2 (step S2020).

If all authentication ports have received a connection request packet in the predetermined order, the server computer 1 transmits a connection request acknowledgement packet in response to one of the connection request packets from the client computer 2 (step S2090), thereby deleting the entry of the connection requester from the connection control table 1220 (step S2100).

Thereafter, upon receiving an acknowledgment packet from the connection requester, the server computer 1 establishes a connection with the connection requester to perform communication between their applications.

In the second modification, to access the server computer, it is necessary to estimate both authentication port numbers and the order of access thereto, which makes it difficult for an illegitimate connection requester to access the server computer. Thus, the security of the server computer is much enhanced.

(Third Modification of the Second Embodiment)

A description will be given of a case where identification is performed, using authentication port numbers and providing a time limit to access the numbers.

FIGS. 19A, 19B and 19C are views illustrating a connection establishment table 1030, determination table 1130 and connection control table 1230 employed in the third modification of the second embodiment.

The connection establishment table 1030 holds server names for discriminating server computers 1 that perform authentication, in relation to respective combinations of port numbers needed for authentication, and periods within which access is possible. The access possible periods are measured from the time when a certain client computer 2 for the first time starts to access each server computer 1. As previously explained, each authentication port number in the table is commonly used as secret information between the certain client computer 2 and each server computer 1.

The determination table 1130 holds a combination of port numbers necessary for identifying a client computer 2 when it is connected to a certain server computer 1, and also holds a period within which access is possible. Each authentication port number is commonly used as secret information between client computers 2 and the server computer 1. In this table example, a common combination of authentication port numbers and a common period are used for all client computers 2. However, different combinations of authentication port numbers and/or different periods may be used for different client computers 2. In this case, different combinations of authentication port numbers and/or different periods are held in relation to identification information for identifying respective client computers 2.

The connection control table 1230 shows the status of processing currently performed by each client computer 2 for establishing a connection to a certain server computer 1. Each time a client computer 2 accesses the server computer 1 using a legitimate port number, the table 1230 holds this port number in relation to identification information for identifying the client computer 2.

Figure 20:
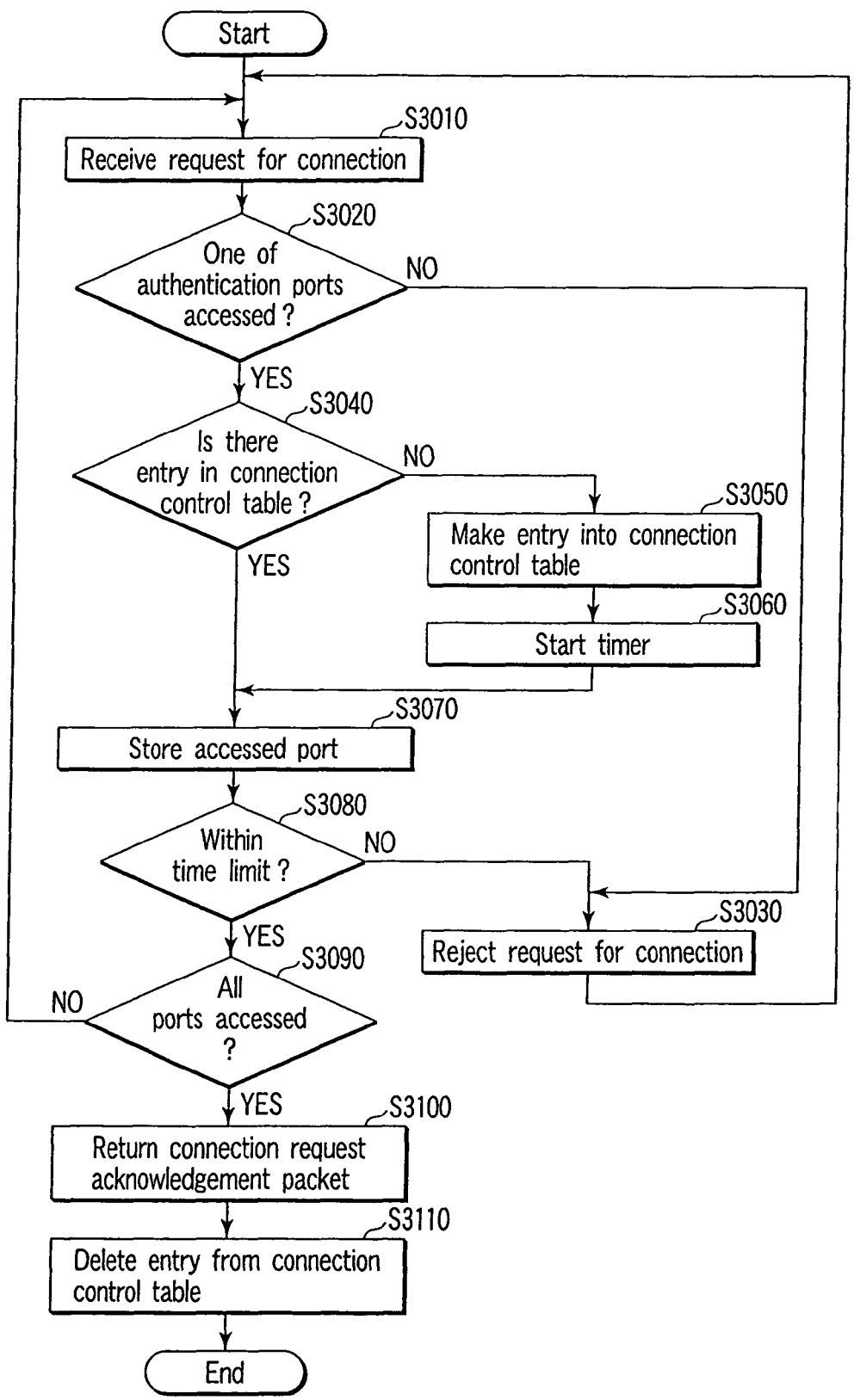
FIG. 20 is a flowchart useful in explaining the procedure of processing performed by a server computer 1 according to the third modification of the second embodiment.

FIG. 20 is a flowchart useful in explaining the procedure of processing performed by the server computer 1. The procedure of processing performed by the client computer 2 to establish a connection to the server computer 1 is similar to that illustrated in the flowchart of FIG. 12. However, to enhance the efficiency of processing, the procedure of FIG. 12 may be modified such that if the time required for the transmission of a connection request packet from the client computer 2 exceeds a limit period, processing is finished without waiting for a connection request acknowledgment packet from the server computer 1.

When the server computer 1 receives a connection request packet (step S3010), it determines with reference to the determination table 1130 whether the destination port number contained in the packet corresponds to one of the authentication port numbers (step S3020). If the destination of the connection request packet is none of the authentication ports, the server computer 1 rejects the connection request packet, and deletes its entry, if it exists, from they connection control table, and waits for the next connection request packet (step S3030).

On the other hand, if the destination port number contained in the packet corresponds to one of the authentication port numbers, the server computer 1 refers to the connection control table 1230 to check whether there is an entry of the connection requester (step S3040). If the connection control table 1230 holds no entry of the connection requester, its entry is added. Specifically, the identification of the connection requester (in this modification, the IP address of the client computer 2) is held (step S3050).

Subsequently, a timer (not shown) for measuring a time elapsing from the start of identification of the client computer 2 is activated (step S3060).

After that, the number assigned to an authentication port, to which the connection request packet is transmitted, is added to the entry of the connection requester in the connection control table 1230 (step S3070).

Referring to both the connection control table 1230 and determination table 1130, the server computer 1 confirms whether the time measured by the timer does not exceed the time limit of identification (step S3080). If the measured time exceeds the time limit, the connection request packet is rejected and the entry of the client computer 2 is deleted from the connection control table 1230 (step S3030).

On the other hand, if the measured time does not reach the time limit, it is confirmed, with reference to both the connection control table 1230 and determination table 1130, whether a connection request packet is transmitted to all authentication ports (step S3090). If there remains an authentication port to which a connection request packet is not yet transmitted, the next connection request packet is waited for (step S3010).

If it is determined that a connection request packet is transmitted from the client computer 2 to all authentication ports, the acknowledgement packet generator 150 transmits a connection request acknowledgement packet corresponding to one of the connection request packets from the client computer 2 (step S3100). After that, the entry of the connection requester is deleted from the connection control table 1230 (step S3110).

Thereafter, the server computer 1 receives an acknowledgement packet from the connection requester, thereby establishing a connection thereto to perform communication between their applications.

In the third modification, it is necessary to transmit a connection request packet to an authentication port within a predetermined period. This reduces the chances of attacks against server computers by illegitimate client computers, therefore enhances the security of the server computers. Further, since the time required for each server computer to hold information concerning each client computer is also limited, the resources of each server computer required for authentication processing can be reduced.

(Fourth Modification of the Second Embodiment)

A description will be given of a case where identification is performed by transmitting a connection request packet to different authentication ports at different intervals.

FIGS. 21A, 21B and 21C are views illustrating a connection establishment table 1040, determination table 1140 and connection control table 1240 employed in a fourth modification of the second embodiment.

The connection establishment table 1040 holds server names for discriminating server computers 1 that perform authentication, in relation to respective combinations of port numbers needed for authentication, and intervals at which a connection request packet is transmitted from a certain client computer 2 to authentication ports of each server computer 1 that correspond to the port numbers. As previously explained, each authentication port number and/or the corresponding interval in the table is commonly used as secret information between the certain client computer 2 and each server computer 1.

The determination table 1140 holds a combination of port numbers necessary for identifying a client computer 2 when it is connected to a certain server computer 1, in relation to intervals at which a connection request packet is transmitted to the authentication ports corresponding to the port numbers. Each authentication port number and/or a corresponding interval is commonly used as secret information between client computers 2 and the server computer 1. In this table example, a common combination of authentication port numbers and/or common intervals are used for all client computers 2. However, different combinations of authentication port numbers and/or different intervals may be employed for different client computers 2. In this case, such different data items are arranged in relation to identification information for identifying respective client computers 2.

The connection control table 1240 shows the status of processing currently performed by each client computer 2 for establishing a connection to a certain server computer 1. Each time a client computer 2 accesses the server computer 1 using a legitimate port number, the table 1240 holds the port number in relation to identification information for identifying the client computer 2.

Figure 22:
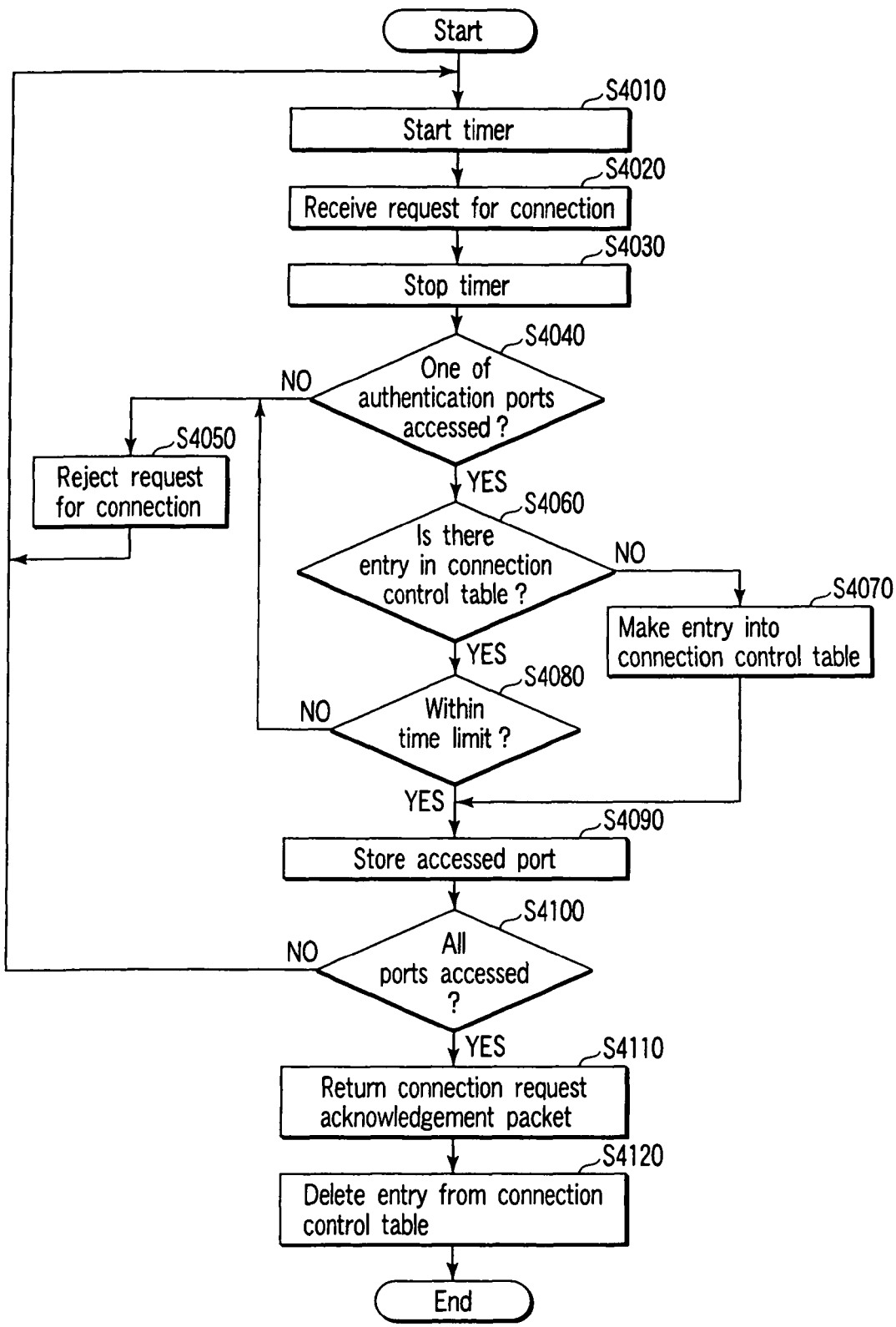
FIG. 22 is a flowchart useful in explaining the procedure of processing performed by a server computer 1 according to the fourth modification of the second embodiment.

FIG. 22 is a flowchart useful in explaining the procedure of processing performed by the server computer 1 of the fourth modification of the second embodiment.

When a client computer 2 establishes a connection with the server computer 1, it refers to the connection establishment table 1040 and transmits a connection request packet to authentication ports of the server computer 1. Specifically, when the client computer 2 transmits the ith connection request packet, it transmits this packet a predetermined period later than the (i−1)th connection request packet, the predetermined period being defined in the connection establishment table 1040.

The server computer 1 starts a timer (step S4010), and stops it (step S4030) when having received the ith connection request packet from the client computer 2 (step S4020). At the next step S4040, the server computer 1 determines, referring to the determination table 1140, whether the destination port of the received connection request port is one of the authentication ports. If the destination port of the received connection request port is none of the authentication ports, the server computer 1 rejects this connection request packet (step S4050), thereby restarting the timer (step S4010) and waiting for the next connection request packet (step S4020).

If the destination port number of the ith connection request packet indicates one of the authentication ports, the server computer 1 refers to the connection control table 1240 to check whether an entry of the connection requester has already been made (step S4060). If there is no entry of the connection requester, an entry is added for it (step S4070), and the server computer 1 proceeds to the storage of the access port (step S4090).

On the other hand, if an entry of the connection requester has already been made, the server computer 1 refers to the determination table 1140 and determines whether the interval between the (i−1)th and ith connection request packets measured by the timer is identical to the predetermined interval (step S4080). If they are identical to each other, the server computer 1 proceeds to the storage of the access port (step S4090). If they are not identical to each other, the server computer 1 rejects the connection request packet (step S4050), thereby restarting the timer (step S4010) and waiting for the next connection request packet (step S4020).

After the storage of the access port, the server computer 1 confirms whether a connection request packet is transmitted to all authentication ports (step S4100). If an authentication port, to which a connection request packet is not yet transmitted, remains, the server computer 1 restarts the timer and waits for another connection request packet (step S4020).

On the other hand, if it is determined that a connection request packet is transmitted to all authentication ports, a connection request acknowledgement packet is transmitted, which corresponds to one of the connection request packets from the connection requester (step S4110). After that, the entry of the connection requester is deleted from the connection control table 1240 (step S4120).

After that, the server computer 1 receives an acknowledgement packet form the client computer 2, thereby establishing a connection therewith to perform communication between their applications.

Further, only the access interval may be used as authentication information. In this case, no authentication ports are specified, and a connection request packet is transmitted at predetermined access intervals to ports with any port numbers (or to only one authentication port).

In the fourth modification, it is necessary to estimate, as well as authentication port numbers, the intervals at which authentication ports corresponding to the numbers are accessed, which makes it difficult to perform illegitimate access. As a result, the security of the server computer 1 is much more enhanced.

As another identification example, it is possible to use a plurality of authentication port numbers and preset the types of connection request packets to be transmitted to authentication ports corresponding to the port numbers.

Packets transmitted from the client computer 2 to the authentication ports of the server computer 1 may include ICMP packets and UDP packets, as well as TCP packets as standard connection request packets. In this example, authentication port numbers and the types of packets transmitted to authentication ports corresponding to the port numbers are preset as authentication information between the client computer 2 and server computer 1. Further, a connection establishment table 1050 and determination table 1150 hold port numbers, and the types (UDP, TCP, ICMP) of packets received by authentication ports corresponding to the port numbers (see FIGS. 23A, 23B and 23C). In this case, however, no port number are prepared for ICMP packets, therefore concerning ICMP, only type determination is performed, or the value of the type field for ICMP packets is used instead of the port number. The server computer 1 also determines the type of the ith packet for authentication.

Since UDP and ICMP use connectionless type packets, the connection request acknowledgement packet transmitted from the server computer 1 when authentication has succeeded is a SYN/ACK packet to be returned in response to a TCP connection request packet (SYN packet).

The authentication information employed in the above-described modifications is preset before connection requests are issued. However, the authentication information can be varied each time a connection request is issued, using, for example, one-time password technique. This prevents illegitimate access reusing authentication information, and hence can further enhance the security of the server computer.

Furthermore, in the modifications, a connection request acknowledgement packet is transmitted in response to one of the connection request packets received from the client computer 2. However, it is also possible to transmit respective connection request acknowledgement packets in response to several of the received connection request packets.

Third Embodiment

A third embodiment of the invention will now be described in detail.

In the third embodiment, connection is established by encryption using a cipher key as common secret information between the server computer 1 and client computer 2. Specifically, a common key is used as the cipher key, and message authenticator generation processing based on a hash function using the common key is performed as encryption. Concerning the cipher key and encryption, common key coding using a common key, or public key coding using a public key may be performed. It is sufficient if the cipher key and encryption enables a person to decrypt information only using a cipher key, and prevents a person with no cipher key from generating or decrypting encrypted information.

When common key encryption is performed using a common key, coding/decoding is performed using a message authenticator generating portion employed in the following embodiment. When encryption is performed using a public key, it is sufficient if the client computer 2 generates a digital signature using its own secret key, and uses it instead of the message authenticator. Further, in this case, the server computer 1 identifies the digital signature using, instead of the message authenticator, the public key of the client computer 2, when identifying a connection request packet.

Figure 24:
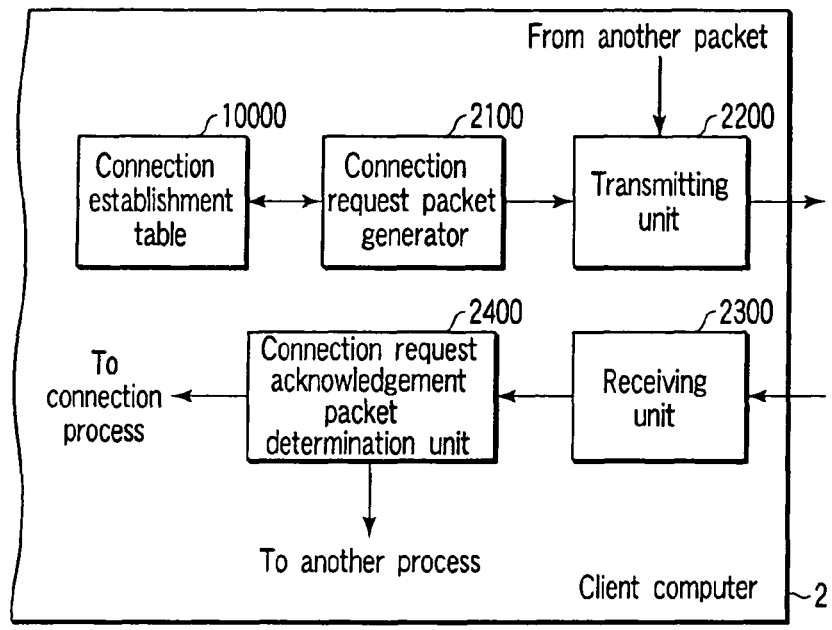
FIG. 24 is a block diagram illustrating function blocks incorporated in a client computer 2 according to the third embodiment of the invention.

FIG. 24 is a block diagram illustrating function blocks incorporated in the client computer 2 according to the third embodiment of the invention.

Upon receiving an instruction to transmit a connection request to the server computer 1, a connection request packet generator 2100 generates a connection request packet. Specifically, the connection request packet generator 2100 refers to a connection establishment table 10000, and acquires therefrom a common key used to establish a connection with the server computer 1. This common key is commonly used as secret information between the client computer 2 and server computer 1. Common use of the common key may be realized, kept secret from a third party, using an on-line system in which a channel secured by a cipher protocol (provided by, for example, a secure socket layer (SSL) technique) is utilized, or using an off-line system such as mailing. Further, each connection requester may hold different common keys for different servers.

The connection request packet generator 2100 creates a message authenticator A from randomly generated data rnd, using the common key and a predetermined hash function, and uses the data rnd and message authenticator A as authentication information. Subsequently, to adjust the authentication information to a size that can be stored in the sequence number field of a connection request packet, the packet generator 2100 divides the authentication information into portions that can be carried by a single connection request packet (hereinafter, the resultant authentication information will be referred to as "the divisional authentication information"). The packet generator 2100 further adds thereto restoration information for restoring the divisional authentication information.

After that, the packet generator 2100 generates a number of connection request packets that can store all divisional authentication information and restoration information, and transmits the packets to the server computer 1, with the divisional authentication information and restoration information stored in the sequence number fields of the packets. Although in this example, the divisional authentication information and restoration information are stored in the sequence number field, they may be stored in the field of the header, other than the sequence number field, in which no problem will be raised during standard communication if data is stored. Further, to authenticate that all connection request packets transmitted belong to the same authentication session, a particular field value (e.g., source IP address) that is common between the packets may be utilized, or a common value may be set as a particular field value (source port number, total length, etc.) of the packets, or part of the field for storing authentication information may be utilized. By using larger-size information, the accuracy to identify the authentication session can be enhanced.

A transmitting unit 2200 transmits IP packets to a network 3. This unit sequentially transmits, to the network 3, connection request packets output from the connection request packet generator 2100.

A receiving unit 2300 receives an IP packet transferred from the network 3 to the client computer 2. This packet is transmitted to a connection request acknowledgement packet determination unit 2400, where it is determined whether the IP packet is a connection request acknowledgement packet returned in response to any one of the connection request packets transmitted from the transmitting unit 2200. If the IP packet is the connection request acknowledgement packet, the client computer 2 performs processing for establishing a connection to the server computer 1.

Figure 25:
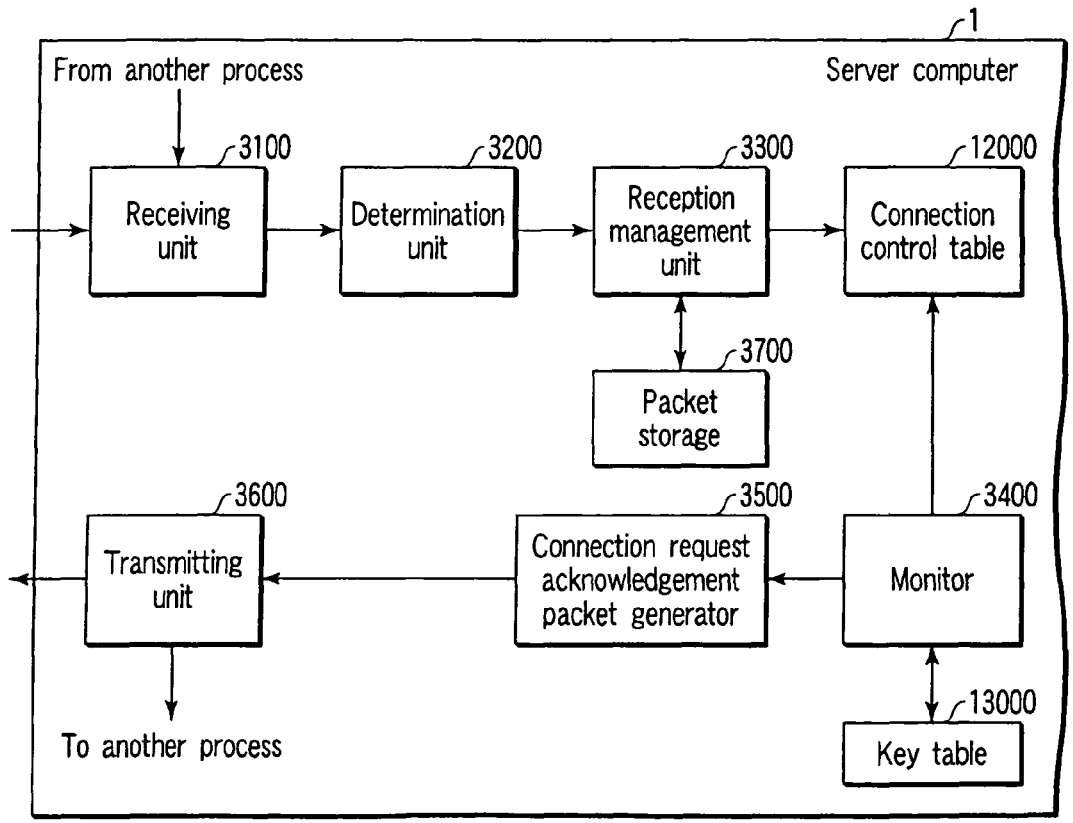
FIG. 25 is a block diagram illustrating function blocks incorporated in a server computer 1 according to the third embodiment of the invention.

FIG. 25 is a block diagram illustrating function blocks incorporated in the server computer 1 according to the third embodiment of the invention.

A receiving unit 3100 receives an IP packet transferred from the network 3 to the server computer 1. A determination unit 3200 determines whether the IP packet received by the receiving unit 3100 is a connection request packet, and transmits it to a reception management unit 3300 only when the IP packet is a connection request packet.

The reception management unit 3300 temporarily stores the received connection request packet into packet storage 3700, and the following information items (1) to (3) into a connection control table 12000:

(1) Information indicating the authentication session of a connection requester that has transmitted connection request packets (this will hereinafter be referred to as "the authentication session". Specifically, this information includes field values, such as source IP address, source port number, total length, MAC address, etc., or a combination thereof. It is sufficient if the information can be used to identify the connection requester during authentication processing.);

(2) Divisional authentication information and restoration information stored in each connection request packet; and (3) Identification information indicating each connection request packet and stored in the packet storage (hereinafter referred to as "the packet identification information").

If the connection control table 12000 already holds an entry that indicates the authentication session identifying information from the client computer 2, the acquired authentication information is added to the entry. If no such entry exists, a new entry is added.

A monitor 3400 monitors whether the number of divisional authentication information items and restoration information items, held in each entry (discriminated by authentication session identifying information) in the connection control table 12000, reaches a predetermined value that enables authentication information to be restored. If the number reaches the predetermined value, a common key is acquired from a key table 13000, and authentication is performed based on the information arranged in the connection control table 12000. Specifically, divisional authentication information is restored to authentication information based on the restoration information. Subsequently, a message authenticator B is generated, using the same hash function as used in the client computer 2, based on the data rnd randomly generated and transmitted together with a connection request packet by the client computer 2, and the common key acquired from the key table 13000. After that, it is confirmed whether the generated message authenticator B is identical to the message authenticator A contained in the connection request packet from the client computer 2.

If they are identical to each other, the monitor 3400 informs a connection request acknowledgement packet generator

3500 of this. If, on the other hand, they are not identical, the packet identifications of the connection request packets included in the authentication session are determined with reference to the connection control table 12000, thereby deleting all the connection request packets from a packet storage 3700 and also deleting the entry from the connection control table 12000.

If it is informed that the message authenticator B is identical to the message authenticator A, the connection request acknowledgement packet generator 3500 determines at least one of the connection request packets included in the authentication session, in replay to which an acknowledge packet is returned. Subsequently, the generator 3500 refers to packet storage 3700 based on the packet identification information acquired from the connection control table 12000, and generates a connection request acknowledgement packet for response after checking the data of the present connection request packet. After generating the connection request acknowledgement packet, the generator 3500 deletes all the connection request packets of the authentication session from the packet storage 3700, and also deletes the corresponding entry from the connection control table 12000.

A transmitting unit 3600 transmits, to the network 3, the connection request acknowledgement packet generated by the connection request acknowledgement packet generator 3500. The transmitted packet is received by the above-described receiving unit 2300 of the client computer 2.

Also in the third embodiment, various authentication methods can be used depending upon the authentication information exchanged between the client computer 2 and server computer 1.

Two authentication method examples will now be described, and the operations of the client computer 2 and server computer 1 performed when each of these methods is employed will be described.

(First Modification of the Third Embodiment)

Figures 26A, 26B, 26C:
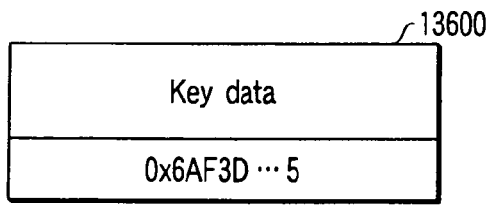
FIGS. 26A, 26B and 26C are views illustrating a connection establishment table 10600, connection control table 12600 and key table 13600 employed in a first modification of the third embodiment.

FIGS. 26A, 26B and 26C are views illustrating a connection establishment table 10600, connection control table 12600 and key table 13600 employed in the first modification of the third embodiment.

The connection establishment table 10600 holds server names for discriminating server computers 1 that perform authentication, in relation to respective common keys for service authentication. As described above, each common key in the table is commonly used as secret information between a certain client computer 2 and each server computer 1.

The connection control table 12600 holds information needed to authenticate each connection request packet transmitted from the client computer 2. This information includes an authentication session identification, packet identification and divisional authentication information. In this modification, an IP address and source port number are used as the authentication session identification, and the divisional authentication information is the value of the sequence number field.

The key table 13600 holds a common key for checking authentication information contained in each connection request packet from the client computer 2. In this modification, a single common key is used for is all client computers. However, different common keys may be used for different connection requesters. In this case, key number information is held as part of authentication information transmitted from each connection requester, and the server computer determines the common key to use.

Figure 28:
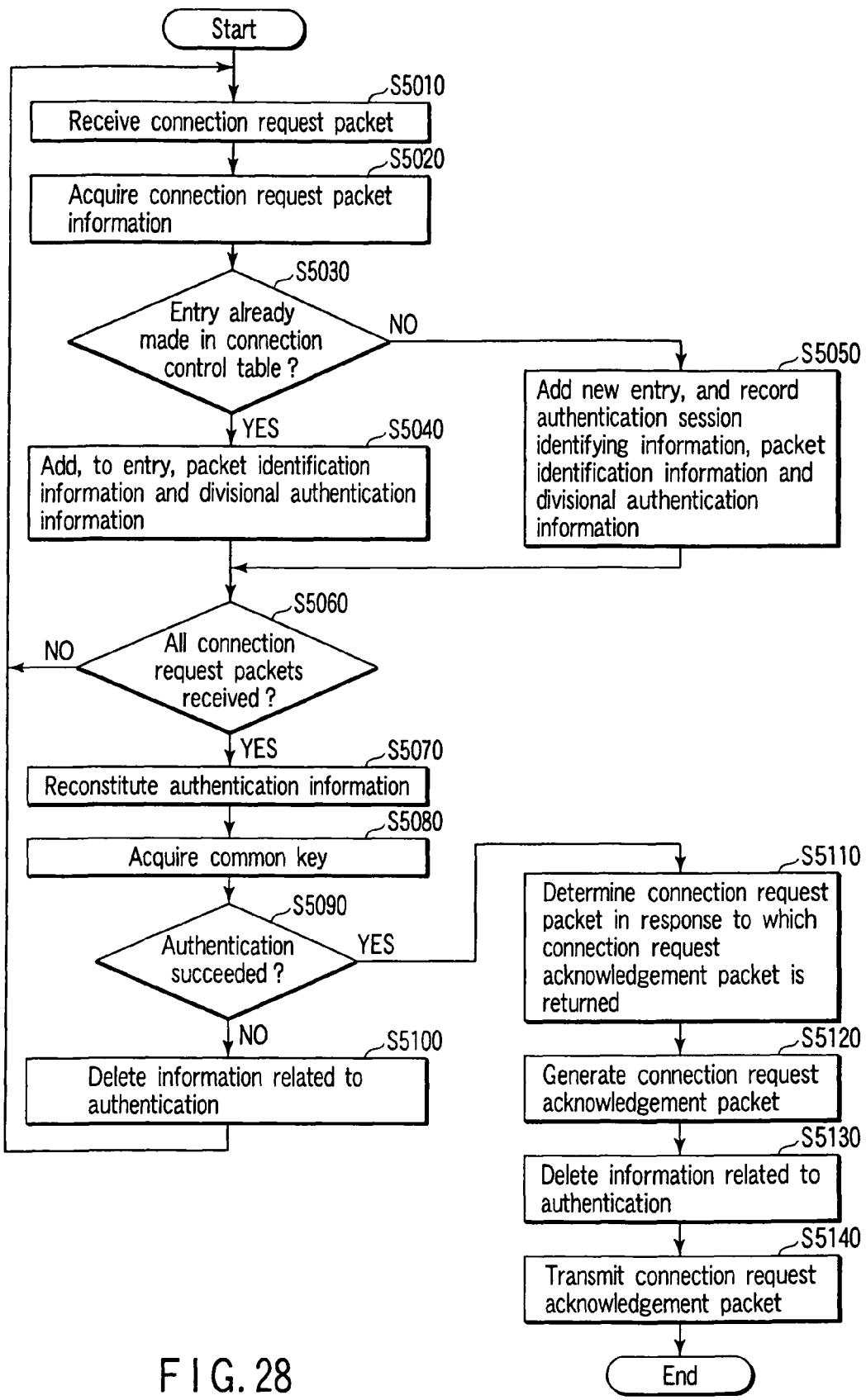
FIG. 28 is a flowchart useful in explaining the procedure of processing performed by a server computer 1 according to the first modification of the third embodiment.

FIG. 27 is a flowchart useful in explaining the procedure of processing performed by the client computer 2, and FIG. 28 is a flowchart useful in explaining the procedure of processing performed by the server computer 1. Referring first to FIG. 27, the processing procedure of the client computer 2 will be described.

When the client computer 2 establishes a connection to the server computer 1, firstly, the connection request packet generator 2100 refers to the establishment table 10600, thereby acquiring a common key used for the establishment of a connection to the server computer 1 (step C5010), and generating a standard SYN packet to be transmitted to the server computer 1 (step C5020).

Subsequently, the connection request packet generator 2100 applies a hash function using the common key to the value SQ for the sequence number field of the generated SYN packet, thereby generating a message authenticator A (step C5030). When the server computer 1 uses different common keys for different connection requesters, key numbers for identifying the common keys are also arranged in the connection establishment table 10600. If this key-number information is also used to generate a message authenticator A, the legitimacy of each key number is also guaranteed. Since, in general, the sequence number of each connection request packet generated by the connection request packet generator is a random number, a message authenticator is created using the sequence number as an input.

After that, SQ is stored into the sequence number field of the connection request packet (this packet will hereinafter be referred to as "SYN0"). Subsequently, the message authenticator A is divided (step S5040). At this time, the message authenticator A is divided into portions of a size with which each divisional message authenticator and order information for restoring each divisional message authenticator can be stored in the sequence number field. Then, a plurality of SYN packets to be transmitted to the server computer 1 are generated so that they can store respective data items formed of all divisional message authenticators A and their order information. These data items are stored into the sequence number fields of the generated packets, and the thus-obtained packets are all transmitted (step S5050). If the server computer 1 identifies each connection requester using a key number, the key number may be transmitted as part of the authentication information. The order information is necessary to arrange the connection request packets in order in a transmission path or in a transmission or reception queue. The way of determination of the order depends upon the entire size of the authentication information or the size of the message authenticator A contained therein. Further, the way of division and the way of storage are not limited to particular ways. It is sufficient if they are predetermined between the server computer 1 and client computer 2, and the divisional authentication information, stored in the sequence number fields of the connection request packets transmitted using those ways, is restored to its original authentication information.

After the above-described processes, the client computer 2 waits for a connection request acknowledgement packet from the server computer 1 (step S5060). The client computer 2 determines whether there is a response from the server computer (step S5070). If there is no response for a predetermined period, it is determined that authentication has failed, and authentication processing is finished. If the client computer 2 has received a connection request acknowledgement packet returned by the server computer 1 in response to any one of the connection request packets, it transmits an acknowledgement packet (step S5080). As a result, a connection is established between the client computer 2 and server computer 1.

Referring then to FIG. 28, the processing procedure of the server computer 1 will be described.

The server computer 1 receives a connection request packet (step S5010). Specifically, the receiving unit 3100 receives, via the network 3, an IP packet directed to the server computer 1, and the determination unit 3200 confirms that the IP packet is a connection request packet.

The reception management unit 3300 of the server computer 1 temporarily stores the received connection request packet in the packet storage 3700, and acquires three information items, i.e., the identification information of the connection request packet (packet identification information), the combination (authentication session identifying information) of the source IP address and source port number stored in the connection request packet, and the sequence number field value (divisional authentication information) (S5020). In this modification, the authentication session identifying information for identifying the connection requester in the connection control table 12600 is a combination of the source IP address and source port number of the client computer 2. However, an MAC address or any other identification may be used. It is sufficient if the information can be used to identify the connection requester during authentication processing.

After that, based on the acquired authentication session identifying information, the reception management unit 3300 refers to the connection control table 12600 to confirm whether there is an entry that hold the authentication session identifying information (S5030). If there is such an entry, the packet identification information and authentication information are added into the entry (S5040), whereas if there is no such entry, a new entry is added, thereby storing the authentication session identifying information, packet identification information and authentication information into the connection control table 12600 (S5050).

The monitor 3400 refers to the connection control table 12600, and confirms whether a number of connection request packets, necessary to reconstitute the authentication information, have been received (S5060). If a required number of connection request packets are not yet received, the process is returned to step S5010, where the next connection request packet is waited for. On the other hand, if a required number (=all) of connection request packets are received, firstly, the divisional authentication information corresponding to the received packets is acquired from the connection control table 12600 and restored to its original authentication information (S5070). Subsequently, a common key is acquired from the key table 13600 (S5080). If different common keys are allocated to different connection requesters, a key number contained in the reconstituted authentication information is acquired and the key corresponding to the key number is acquired from the key table.

After that, the server computer 1 extracts, from the reconstituted authentication information, the sequence number value SQ contained in SYN0, thereby generating a message authenticator B using the common key. The server computer 1 then compares it with the message authenticator A contained in the authentication information to authenticate the connection requester (S5090). If the authentication information includes a key number as argument information used when the connection requester the message authenticator, the key number is also acquired and added as another argument to the hash function for generating the message authenticator. If authentication has failed, all connection request packets belonging to the authentication session are deleted from the package storage 3700, and its entry is deleted from the connection control table 12600 (S5100). Thereafter, the process is returned to step S5010, where the next connection request packet is received. If, on the other hand, authentication has succeeded, this is reported to the connection request acknowledgement packet generator 3500.

Upon receiving a message that the authentication process has succeeded, the connection request acknowledgement packet generator 3500 determines at least one connection request packet included in the authentication session, in response to which a connection request acknowledgement packet is to be returned (S5110).

Based on the packet identification information acquired from the connection control table 12600, the connection request acknowledgement packet generator 3500 refers to the packet storage 3700 to generate a connection request acknowledgement packet (acknowledgement packet) (S5120). After that, the connection request acknowledgement packet generator 3500 deletes all connection request packets belonging to the authentication session, and deletes the entry of the authentication session from the connection control table 12600 (S5130). The one of the connection request packets, in response to which a connection request acknowledgement packet should be returned, can be determined in the following manners:

1) A connection request acknowledgement packet is returned in response to the last connection request packet;

2) When the nth (n is a preset number) connection request packet is received, an acknowledgement packet is returned; and 3) When a connection request packet that stores particular information included in authentication information is received, an acknowledgement packet is returned.

If one of the above manners is employed, the capacity of the packet storage 3700 can be reduced by deleting, from the packet storage, the connection request packets to which no response is transmitted, or by storing no such packets in the packet storage. Further, if one of the above manners is employed, it is sufficient if the client computer 2 waits for a acknowledgement packet returned in response to a particular connection request packet. Therefore, the amount of resources of the client computer 2 required for connection processing can be reduced.

The transmitting unit 3600 transmits, to the network 3, the connection request acknowledgement packet generated by the packet generator 3500 (S5140). The transmitted connection request acknowledgement packet is received by the above-mentioned receiving unit 2300 of the client computer 2.

Thereafter, the server computer 1 receives an acknowledgement packet from the connection requester or client computer 2, thereby establishing a connection to enable communication therebetween using their applications.

This modification is free from the attack of establishing a connection by an illegitimate client who does not know a common key, using an IP address acquired by forging the IP address of an authenticated client computer. As a result, safer authentication than in the prior art can be performed.

(Second Modification of the Third Embodiment)

A description will be given of a case where a message authenticator is created using, as another argument of a hash function, time information contained in authentication information transmitted from a connection requester.

FIGS. 29A and 29B are views illustrating a connection control table 12700, and a replay-preventing table 14700 newly connected to the monitor 3400.

The connection control table 12700 holds, in addition to the contents of the connection control table 12600, authentication session start time information acquired from a time-providing unit (not shown) connected to the reception management unit 3300 for providing time information.

The reply-preventing table 14700 holds indexes in relation to time information TC contained in each connection request packet. To reduce the resources of the server computer 1 required for authentication processing, only appropriate accuracy information may be held as time information. Since the indexes are referred to by message authenticators A, the maximum value of the indexes corresponds to the maximum sequence number field for storing a message authenticator A. Further, to reduce the required memory of the server computer 1, a general memory saving way, such as use of a hash table, may be utilized.

In the second modification, to establish a connection between the client computer 2 and server computer 1, the process described below is additionally performed in connection request packet generating processing employed in the first modification. In this case, time information TC acquired from a time-providing unit (not shown) connected to the connection request packet generator 2100 for providing time information is also used as authentication information. The client computer 2 adds time information TC to the arguments for the hash function in the process of generating a message authenticator A, and transmits time information TC also as authentication information. Assume here that the time-providing unit of the server computer 1 is synchronized with that of the client computer 2 so as not to generate a time error greater than a preset allowable range.

In the second modification of the third embodiment, the server computer 1 performs the following process in addition to the processes performed in the first modification for checking each connection request packet. Firstly, the present time acquired from the time-providing unit is compared with the authentication session start time held in the connection control table 12700, thereby confirming that the difference therebetween exceeds the time error allowable range. Subsequently, the replay-preventing table 14700 is referred to, using the value of the message authenticator A as a key, and confirms that the time information provided by the time-providing unit is not identical to the time information TC. If they are not identical, it is confirmed that this process is not a reply process. At this time, the time information TC stored in the present connection request packet is written over the time information in the replay-preventing table 14700. Thus, when the confirmation processes have succeeded, this is reported to the connection request acknowledgement packet generator 3500. It is assumed here that the message authenticator A has a relatively long random-number cycle, therefore does not have the same value within the allowable time range.

The second modification of the third embodiment can prevent the attack of tapping a connection request packet transmitted from a client computer 2 to a server computer 1, and re-transmitting the tapped information to establish an illegal connection. Thus, the reliability of communication is further enhanced.

The above-described embodiments is free from the attack of establishing a connection by an illegitimate client who does not know a common key, using an IP address acquired by forging the IP address of an authenticated client computer. As a result, safer authentication than in the prior art can be performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An authentication method for use in a server computer for authenticating that a client computer connected to the server computer via a network is a legitimate client computer, if starting communication with the client computer, the method comprising:
   receiving, by the server computer, a plurality of connection request packets from the client computer;
   storing, in a storage of the server computer, a plurality of group identification information items for identifying, respectively, a plurality of groups, in relation to connection information indicating a number of connection request packets uniquely and secretly allocated to each of the groups, each group including a plurality of users allowed to access the server computer;
   counting connection request packets received from the client computer within a preset period to obtain a counted number;
   determining whether an information item included in the connection information corresponds to the counted number;
   authenticating a sender of the connection request packets if the information item included in the connection information corresponds to the counted number;
   generating a connection request acknowledgement packet in response to at least one of the connection request packets, if the sender is authenticated; and
   transmitting the generated connection request acknowledgement packet to the client computer.

2. The authentication method according to claim 1, wherein the connection request acknowledgement packet is generated in response to at least one connection request packet included in the connection request packets and indicated by an information item preset between the server computer and the client computer.

3. An authentication method for use in a server computer for authenticating that a client computer connected to the server computer via a network is a legitimate client computer, if starting communication with the client computer, the method comprising:
   pre-storinq, by the server computer, a cipher key used between the server computer and the client computer;
   receiving a plurality of connection request packets from the client computer;
   storing, in a storage of the server computer, a plurality of group identification information items for identifying, respectively, a plurality of groups, in relation to connection information indicating a number of connection request packets uniquely and secretly allocated to each of the groups, each group including a plurality of users allowed to access the server computer;
   counting, by the server computer, connection request packets received from the client computer within a preset period to obtain a counted number;
   determining, by the server computer, whether an information item included in the connection information corresponds to the counted number;
   authenticating a sender of the connection request packets based on the pre-stored cipher key if the information item included in the connection information corresponds to the counted number;
   generating a connection request acknowledgement packet in response to at least one of the connection request packets, if the sender is authenticated; and
   transmitting the generated connection request acknowledgement packet to the client computer.

4. The authentication method according to claim 3, wherein the connection request acknowledgement packet is generated in response to at least one connection request packet included in the connection request packets and indicated by an information item preset between the server computer and the client computer.

5. An authentication method for use in a server computer for authenticating that a client computer connected to the server computer via a network is a legitimate client computer, if starting communication with the client computer, the method comprising:
- presetting, by the server computer, an information item concerning a plurality of connection request packets;
- storing the information item as an access pattern information item;
- receiving a plurality of connection request packets from the client computer;
- storing, in a storage of the server computer, a plurality of group identification information items for identifying, respectively, a plurality of groups, in relation to connection information indicating a number of connection request packets uniquely and secretly allocated to each of the groups, each group including a plurality of users allowed to access the server computer;
- counting connection request packets received from the client computer within a preset period to obtain a counted number;
- determining whether an information item included in the connection information corresponds to the counted number;
- generating a connection request acknowledgement packet in response to at least one of the received connection request packets, if the received connection request packets satisfy the access pattern information item and if the information item included in the connection information corresponds to the counted number; and
- transmitting the generated connection request acknowledgement packet to the client computer.

6. The authentication method according to claim 5, wherein the access pattern information item includes port numbers, employed in the server computer, to which the connection request packets are transmitted from the client computer.

7. The authentication method according to claim 6, wherein the access pattern information item further includes order of arrival of the connection request packets.

8. The authentication method according to claim 6, wherein the access pattern information item further includes a valid elapsed time ranging from arrival of a first one of the connection request packets to arrival of a last one of the connection request packets.

9. The authentication method according to claim 6, wherein the access pattern information item further includes a valid elapsed time ranging from arrival of one of the connection request packets to arrival of another.

10. The authentication method according to claim 6, wherein the access pattern information item further includes an information item indicating a category of each of the connection request packets.

11. The authentication method according to claim 5, wherein the connection request acknowledgement packet is generated in response to at least one connection request packet included in the received connection request packets and indicated by an information item preset between the server computer and the client computer.

12. The authentication method according to claim 5, further comprising changing the access pattern information item each time the connection request acknowledgement packet is transmitted to the client computer.

13. A server computer for authenticating that a client computer connected to the server computer via a network is a legitimate client computer, if starting communication with the client computer, the server computer comprising:
- a receiving unit configured to receive a plurality of connection request packets from the client computer;
- a storage unit configured to store a plurality of group identification information items for identifying, respectively, a plurality of groups, in relation to connection information indicating a number of connection request packets uniquely and secretly allocated to each of the groups, each group including a plurality of users allowed to access the server computer;
- a counting unit configured to count connection request packets received from the client computer within a preset period to obtain a counted number;
- a determining unit configured to determine whether an information item included in the connection information corresponds to the counted number;
- an authentication unit configured to authenticate a sender of the connection request packets if the information item included in the connection information corresponds to the counted number;
- a generation unit configured to generate a connection request acknowledgement packet in response to at least one of the connection request packets, if the sender is authenticated; and
- a transmitting unit configured to transmit the generated connection request acknowledgement packet to the client computer.

14. A server computer for authenticating that a client computer connected to the server computer via a network is a legitimate client computer, if starting communication with the client computer, the server computer comprising:
- a storage which pre-stores a cipher key commonly used between the server computer and the client computer;
- a receiving unit configured to receive a plurality of connection request packets from the client computer;
- a storage unit configured to store a plurality of group identification information items for identifying, respectively, a plurality of groups, in relation to connection information indicating a number of connection request packets uniquely and secretly allocated to each of the groups, each group including a plurality of users allowed to access the server computer;
- a counting unit configured to count connection request packets received from the client computer within a preset period to obtain a counted number;
- a determining unit configured to determine whether an information item included in the connection information corresponds to the counted number;
- an authentication unit configured to authenticate a sender of the connection request packets based on the pre-stored cipher key if the information item included in the connection information corresponds to the counted number;
- a generation unit configured to generate a connection request acknowledgement packet in response to at least one of the connection request packets, if the sender is authenticated; and
- a transmitting unit configured to transmit the generated connection request acknowledgement packet to the client computer.

15. A server computer for authenticating that a client computer connected to the server computer via a network is a legitimate client computer, if starting communication with the client computer, the server computer comprising:
- a presetting unit configured to preset an information item concerning a plurality of connection request packets, and store the information item as an access pattern information item;
- a receiving unit configured to receive a plurality of connection request packets from the client computer;
- a storage unit configured to store a plurality of group identification information items for identifying, respectively, a plurality of groups, in relation to connection information indicating a number of connection request packets uniquely and secretly allocated to each of the groups, each group including a plurality of users allowed to access the server computer;
- a counting unit configured to count connection request packets received from the client computer within a preset period to obtain a counted number;
- a determining unit configured to determine whether an information item included in the connection information corresponds to the counted number;
- a monitor which monitors whether the received connection request packets satisfy the access pattern information item;
- a generating unit configured to generate a connection request acknowledgement packet in response to one of the received connection request packets, if the received connection request packets satisfy the access pattern information item and if the information item included in the connection information corresponds to the counted number; and
- a transmitting unit configured to transmit the generated connection request acknowledgement packet to the client computer.

16. The server computer according to claim 15, wherein the access pattern information item includes port numbers, employed in the server computer, to which the connection request packets are transmitted from the client computer.

17. A non-transitory computer readable medium embodied with program computer-executable codes for connecting a server computer to a client computer via a network, if starting communication with the client computer, the medium comprising:
- first computer-executable code for instructing the server computer to receive a plurality of connection request packets from the client computer;
- second computer-executable code for instructing the server computer to store, in a storage of the server computer, a plurality of group identification information items for identifying, respectively, a plurality of groups, in relation to connection information indicating a number of connection request packets uniquely and secretly allocated to each of the groups, each group including a plurality of users allowed to access the server computer;
- third computer-executable code for instructing the server computer to count connection request packets received from the client computer within a preset period to obtain a counted number;
- fourth computer-executable code for instructing the server computer to determine whether an information item included in the connection information corresponds to the counted number;
- fifth computer-executable code for instructing the server computer to authenticate a sender of the connection request packets if the information item included in the connection information corresponds to the counted number;
- sixth computer-executable code for instructing the server computer to generate a connection request acknowledgement packet in response to at least one of the connection request packets, if the sender is authenticated; and
- seventh computer-executable code for instructing the server computer to transmit the generated connection request acknowledgement packet to the client computer.

18. A non-transitory computer readable medium embodied with program computer-executable codes for connecting a server computer to a client computer via a network, if starting communication with the client computer, the medium comprising:
- first computer-executable code for instructing the server computer to pre-store a cipher key commonly used between the server computer and the client computer;
- second computer-executable code for instructing the server computer to receive a plurality of connection request packets from the client computer;
- third computer-executable code for instructing the server computer to store, in a storage of the server computer, a plurality of group identification information items for identifying, respectively, a plurality of groups, in relation to connection information indicating a number of connection request packets uniquely and secretly allocated to each of the groups, each group including a plurality of users allowed to access the server computer;
- fourth computer-executable code for instructing the server computer to count, by the server computer, connection request packets received from the client computer within a preset period to obtain a counted number;
- fifth computer-executable code for instructing the server computer to determine, by the server computer, whether an information item included in the connection information corresponds to the counted number;
- sixth computer-executable code for instructing the server computer to authenticate a sender of the connection request packets based on the pre-stored cipher key if the information item included in the connection information corresponds to the counted number;
- seventh computer-executable code for instructing the server computer to generate a connection request acknowledgement packet in response to at least one of the connection request packets, if the sender is authenticated; and
- eighth computer-executable code for instructing the server computer to transmit the generated connection request acknowledgement packet to the client computer.

19. A non-transitory computer readable medium embodied with program computer-executable codes for connecting a server computer to a client computer via a network, if starting communication with the client computer, the medium comprising:
- first computer-executable code for instructing the server computer to preset an information item concerning a plurality of connection request packets, and store the information item as an access pattern information item;
- second computer-executable code for instructing the server computer to receive a plurality of connection request packets from the client computer;
- third computer-executable code for instructing the server computer to store, in a storage of the server computer, a plurality of group identification information items for identifying, respectively, a plurality of groups, in relation to connection information indicating a number of connection request packets uniquely and secretly allocated to each of the groups, each group including a plurality of users allowed to access the server computer;

fourth computer-executable code for instructing the server computer to count connection request packets received from the client computer within a preset period to obtain a counted number;

fifth computer-executable code for instructing the server computer to determine whether an information item included in the connection information corresponds to the counted number;

sixth computer-executable code for instructing the server computer to generate a connection request acknowledgement packet in response to at least one of the received connection request packets, if the received connection request packets satisfy the access pattern information item; and seventh computer-executable code for instructing the server computer to transmit the generated connection request acknowledgement packet to the client computer.

20. The medium according to claim 19, wherein the access pattern information item includes port numbers, employed in the server computer, to which the connection request packets are transmitted from the client computer.

* * * * *

UNITED STATES PATENT AND TRADEMARK OFFICE
CERTIFICATE OF CORRECTION

| | | |
|---|---|---|
| PATENT NO. | : 7,940,761 B2 | Page 1 of 1 |
| APPLICATION NO. | : 12/003924 | |
| DATED | : May 10, 2011 | |
| INVENTOR(S) | : Umesawa et al. | |

It is certified that error appears in the above-identified patent and that said Letters Patent is hereby corrected as shown below:

Claim 3, column 36, line 42, change "pre-storinq" to --pre-storing--.

Signed and Sealed this
Thirtieth Day of August, 2011

David J. Kappos
*Director of the United States Patent and Trademark Office*